(12) United States Patent
Huang et al.

(10) Patent No.: US 12,176,976 B2
(45) Date of Patent: Dec. 24, 2024

(54) DETERMINING TRANSMIT PRECODING MATRIX INDICATORS BASED ON DEVICE FEEDBACK

(71) Applicant: Qualcomm Incorporated, San Diego, CA (US)

(72) Inventors: Min Huang, Beijing (CN); Yu Zhang, San Diego, CA (US); Chao Wei, Beijing (CN); Qiaoyu Li, Beijing (CN); Yuwei Ren, Beijing (CN); Liangming Wu, Beijing (CN); Chenxi Hao, Beijing (CN); Wanshi Chen, San Diego, CA (US); Hao Xu, Beijing (CN)

(73) Assignee: QUALCOMM Incorporated, San Diego, CA (US)

(*) Notice: Subject to any disclaimer, the term of this patent is extended or adjusted under 35 U.S.C. 154(b) by 366 days.

(21) Appl. No.: 17/613,860

(22) PCT Filed: May 14, 2020

(86) PCT No.: PCT/CN2020/090139
§ 371 (c)(1),
(2) Date: Nov. 23, 2021

(87) PCT Pub. No.: WO2020/238632
PCT Pub. Date: Dec. 3, 2020

(65) Prior Publication Data
US 2022/0239351 A1 Jul. 28, 2022

(30) Foreign Application Priority Data

May 31, 2019 (WO) ................ PCT/CN2019/089540

(51) Int. Cl.
*H04B 7/0456* (2017.01)
*H04L 5/00* (2006.01)
*H04L 5/14* (2006.01)

(52) U.S. Cl.
CPC ......... *H04B 7/0456* (2013.01); *H04L 5/0048* (2013.01); *H04L 5/0073* (2013.01); *H04L 5/14* (2013.01)

(58) Field of Classification Search
CPC ... H04B 7/0456; H04L 5/0048; H04L 5/0073; H04L 5/14; H04L 5/001; H04L 5/0091; H04L 5/0094; H04L 5/0023
See application file for complete search history.

(56) References Cited

U.S. PATENT DOCUMENTS 10,404,347 B2  9/2019 Zhang et al.
11,509,569 B2  11/2022 Luo et al.
(Continued)

FOREIGN PATENT DOCUMENTS

CN  104285466 A   1/2015
CN  106063178 A  10/2016
(Continued)

OTHER PUBLICATIONS

Huawei, et al., "UL SRS Design for CSI Acquisition and Beam Management", 3GPP TSG RAN WG 1 Meeting #88, R1-1701699, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 13, 2017-Feb. 17, 2017, Feb. 6, 2017, XP051220574, 8 Pages, figure 2 sections 1, 2.1.1, 2.1.2, 2.2-2.5, part 2.
(Continued)

*Primary Examiner* — Kan Yuen
(74) *Attorney, Agent, or Firm* — QUALCOMM Incorporated

(57) ABSTRACT

Methods, systems, and devices for wireless communications are described for enabling a network equipment to reduce interference for downlink (DL) transmissions to a first device by determining a transmit precoding matrix indicator
(Continued)

(TPMI) for uplink (UL) transmissions transmitted by a second device based on feedback from the first device. The first device may determine a subset of possible TPMIs that the second device may use for UL transmissions for full-duplex communications. The first device may indicate the subset to the network equipment. Based on the subset indicated by the first device, the network equipment may determine a pairing of the first device and the second device for full-duplex communications. Additionally, the network equipment may determine a TPMI for the second device to use in UL transmissions and indicate the TPMI to the second device.

28 Claims, 20 Drawing Sheets

(56) References Cited

U.S. PATENT DOCUMENTS

| | | | | |
|---|---|---|---|---|
| 2010/0183086 | A1* | 7/2010 | Ko | H04L 5/0053 |
| | | | | 375/260 |
| 2017/0048863 | A1* | 2/2017 | Tsai | H04B 7/0617 |
| 2017/0085358 | A1* | 3/2017 | Huberman | H04B 7/0456 |
| 2017/0201300 | A1 | 7/2017 | Parkvall et al. | |
| 2017/0238294 | A1* | 8/2017 | Lim | H04B 7/0695 |
| | | | | 370/277 |
| 2018/0167183 | A1 | 6/2018 | Zhang et al. | |
| 2018/0248606 | A1* | 8/2018 | Choi | H04L 5/0048 |
| 2019/0089423 | A1* | 3/2019 | Davydov | H04B 7/0479 |
| 2020/0076484 | A1* | 3/2020 | Noh | H04B 7/0404 |

FOREIGN PATENT DOCUMENTS

| | | |
|---|---|---|
| CN | 109156022 A | 1/2019 |
| CN | 109417520 | 3/2019 |
| CN | 109600838 A | 4/2019 |
| WO | WO-2011123463 A1 | 10/2011 |
| WO | WO-2012115811 A1 | 8/2012 |
| WO | WO-2017065852 A1 | 4/2017 |
| WO | WO-2017095467 A1 | 6/2017 |
| WO | WO-2017131861 A1 | 8/2017 |
| WO | WO-2018013238 | 1/2018 |
| WO | WO-2018038863 | 3/2018 |

OTHER PUBLICATIONS

Supplementary European Search Report—EP20813643—Search Authority—Munich—Dec. 19, 2022.
International Search Report and Written Opinion—PCT/CN2019/089540—ISA/EPO—Mar. 2, 2020.
International Search Report and Written Opinion—PCT/CN2020/090139—ISA/EPO—Aug. 10, 2020.

* cited by examiner

DETERMINING TRANSMIT PRECODING MATRIX INDICATORS BASED ON DEVICE FEEDBACK

CROSS-REFERENCE TO RELATED APPLICATIONS

The present Application is a 371 national stage filing of International PCT Application No. PCT/CN2020/090139 by Huang et al., entitled "DETERMINING TRANSMIT PRECODING MATRIX INDICATORS BASED ON DEVICE FEEDBACK," filed May 14, 2020; and claims priority to International Patent Application of PCT Application No. PCT/CN2019/089540 by Huang et al., entitled "DETERMINING TRANSMIT PRECODING MATRIX INDICATORS BASED ON DEVICE FEEDBACK," filed May 31, 2019, each of which is assigned to the assignee hereof, and each of which is expressly incorporated by reference in its entirety herein.

TECHNICAL FIELD

This disclosure relates generally to wireless communication, and more specifically, to determining transmit precoding matrix indicators based on device feedback.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some wireless communication systems may include network nodes that support full-duplex communications. A full-duplex network node, such as a base station, may transmit downlink (DL) communications to a UE concurrently with receiving uplink (UL) communications from another UE, which may have the effect of doubling link capacity for the network node. For example, a base station may pair a first UE and a second UE of multiple UEs for full-duplex communications. The base station may transmit a DL transmission to the first UE using the same time and frequency resources (for example, on a same frequency band and in a same time slot) that the base station uses to receive an UL transmission from the second UE. As another example of full-duplex communications, a relay node in a wireless communications network may communicate concurrently with an anchor node and a mobile terminal (such as a UE).

SUMMARY

The described techniques relate to improved methods, systems, devices, and apparatuses that support determining transmit precoding matrix indicators based on device feedback. Generally, the described techniques enable a network equipment such as a base station to reduce interference for downlink (DL) transmissions to a first device by determining a transmit precoding matrix indicator (TPMI) for uplink (UL) transmissions transmitted by a second device based on feedback from the first device. The first device may determine a candidate subset of possible TPMIs the second device may use for UL transmissions for full-duplex communications at the network equipment. In some examples, the base station may indicate the candidate subset to the first device in downlink control information (DCI) or medium access control (MAC) signaling, among other possibilities. In some examples, the candidate subset may be hard-coded or configured by higher-layer signaling, such as radio resource control (RRC) signaling. The first device may measure a reference signal such as a sounding reference signal (SRS) transmitted from the second device to determine a preferable or unpreferable subset of TPMIs from the candidate subset based on an interference metric. The first device may indicate the preferable or unpreferable subset to the base station, for example in a channel state information (CSI) report.

Based on the subset indicated by the first device, the base station may determine a pairing of the first device and the second device for full-duplex communications. Additionally, the base station may determine a TPMI for the second device to use in UL transmissions. If the subset indicated by the first device includes preferable TPMIs, the base station may determine to indicate a TPMI from the preferable subset to the second device. If the subset indicated by the first device includes unpreferable TPMIs, the base station may determine to indicate a TPMI of the candidate subset to the second device that is not included in the unpreferable subset.

One innovative aspect of the subject matter described in this disclosure can be implemented in a method for wireless communications at a first device. The method includes determining a first set of TPMIs associated with transmissions by a second device, receiving a reference signal from the second device, determining an interference metric corresponding to full duplex communications associated with the first device and the second device based on receiving the reference signal, determining a second set of TPMIs from the first set of TPMIs based on the determined interference metric, and transmitting, to a network equipment, an indication of the second set of TPMIs.

Another innovative aspect of the subject matter described in this disclosure can be implemented in an apparatus for wireless communications at a first device. The apparatus may include a processor, memory coupled with the processor, and instructions stored in the memory. The instructions may be executable by the processor to cause the apparatus to determine a first set of TPMIs associated with transmissions by a second device, receive a reference signal from the second device, determine an interference metric corresponding to full duplex communications associated with the first device and the second device based on receiving the reference signal, determine a second set of TPMIs from the first set of TPMIs based on the determined interference metric, and transmit, to a network equipment, an indication of the second set of TPMIs.

Another innovative aspect of the subject matter described in this disclosure can be implemented in an apparatus for wireless communications at a first device. The apparatus may include means for determining a first set of TPMIs associated with transmissions by a second device, receiving a reference signal from the second device, determining an interference metric corresponding to full duplex communications associated with the first device and the second device based on receiving the reference signal, determining a second set of TPMIs from the first set of TPMIs based on the determined interference metric, and transmitting, to a network equipment, an indication of the second set of TPMIs.

Another innovative aspect of the subject matter described in this disclosure can be implemented in a non-transitory computer-readable medium storing code for wireless communications at a first device. The code may include instructions executable by a processor to determine a first set of TPMIs associated with transmissions by a second device, receive a reference signal from the second device, determine an interference metric corresponding to full duplex communications associated with the first device and the second device based on receiving the reference signal, determine a second set of TPMIs from the first set of TPMIs based on the determined interference metric, and transmit, to a network equipment, an indication of the second set of TPMIs.

Some examples of the method, apparatuses, and non-transitory computer-readable medium described herein may further include operations, features, means, or instructions for receiving an indication of a third set of TPMIs based on one or more channel characteristics associated with the second device, where the first set of TPMIs may be determined based on receiving the indication of the third set of TPMIs. In some examples of the method, apparatuses, and non-transitory computer-readable medium described herein, the third set of TPMIs may be received in medium access control signaling or in DCI that may be specific to the first device. In some examples of the method, apparatuses, and non-transitory computer-readable medium described herein, the third set of TPMIs may be received in DCI that may be common to the first device and one or more additional devices.

Some examples of the method, apparatuses, and non-transitory computer-readable medium described herein may further include operations, features, means, or instructions for receiving, from the network equipment, an association between the reference signal received from the second device and the third set of TPMIs. In some examples of the method, apparatuses, and non-transitory computer-readable medium described herein, the association includes an indication of physical resources associated with transmission of the reference signal. In some examples of the method, apparatuses, and non-transitory computer-readable medium described herein, the association between the reference signal received from the second device and the third set of TPMIs includes an explicit mapping. In some examples of the method, apparatuses, and non-transitory computer-readable medium described herein, the association between the reference signal received from the second device and the third set of TPMIs includes an implicit mapping based on an ordering of the third set of TPMIs in a list of a set of subsets of TPMIs.

Some examples of the method, apparatuses, and non-transitory computer-readable medium described herein may further include operations, features, means, or instructions for determining a fourth set of transmit precoding matrix indicators associated with transmissions of a third device, receiving a second reference signal from the third device, determining a second interference metric corresponding to full-duplex communications associated with the first device and the third device based on receiving the second reference signal, determining a fifth set of transmit precoding matrix indicators based on the fourth set of transmit precoding matrix indicators and the second interference metric, and transmitting, to the network equipment, an indication of the fifth set of transmit precoding matrix indicators. In some examples of the method, apparatuses, and non-transitory computer-readable medium described herein, the second device and the third device are grouped for uplink multiple-user multiple-input multiple-output transmission.

In some examples of the method, apparatuses, and non-transitory computer-readable medium described herein, the indication of the third set of TPMIs includes a codepoint or a bitmap. In some examples of the method, apparatuses, and non-transitory computer-readable medium described herein, the codepoint indicates an index of a set of TPMIs in a list of sets of TPMIs. In some examples of the method, apparatuses, and non-transitory computer-readable medium described herein, a size of the list of sets of TPMIs may be equal to a combinatorial number based on selecting the third set of TPMIs from a full set of TPMIs. In some examples of the method, apparatuses, and non-transitory computer-readable medium described herein, a bin of the bitmap indicates whether a TPMI of a full set of TPMIs may be included in the third set of TPMIs, and where a mapping between the bin and the TPMI of the full set of TPMIs may be based on the position of the bin.

In some examples of the method, apparatuses, and non-transitory computer-readable medium described herein, the first set of TPMIs may be hard-coded at the first device or statically configured by high-layer signaling. In some examples of the method, apparatuses, and non-transitory computer-readable medium described herein, determining the interference metric may include operations, features, means, or instructions for determining an interference matrix. Some examples of the method, apparatuses, and non-transitory computer-readable medium described herein may further include operations, features, means, or instructions for receiving a channel state information reference signal from the network equipment, and determining a signal matrix for transmissions from the network equipment based on the channel state information reference signal. Some examples of the method, apparatuses, and non-transitory computer-readable medium described herein may further include operations, features, means, or instructions for determining the second set of TPMIs may be further based on the determined signal matrix.

In some examples of the method, apparatuses, and non-transitory computer-readable medium described herein, determining the second set of TPMIs may include operations, features, means, or instructions for calculating a signal-to-interference-plus-noise ratio (SINR) associated with each TPMI of the first set of TPMIs based on the determined interference metric. In some examples of the method, apparatuses, and non-transitory computer-readable medium described herein, the second set of TPMIs includes TPMIs associated with SINRs that exceed a threshold. In some examples of the method, apparatuses, and non-transitory computer-readable medium described herein, the second set of TPMIs includes a configured number of TPMIs associated with highest SINRs of the calculated SINRs. In some examples of the method, apparatuses, and non-transitory computer-readable medium described herein, the second set of TPMIs includes TPMIs associated with SINRs that fall below a threshold. In some examples of the method, apparatuses, and non-transitory computer-readable medium described herein, the second set of TPMIs includes a configured number of TPMIs associated with lowest SINRs of the calculated SINRs.

In some examples of the method, apparatuses, and non-transitory computer-readable medium described herein, the indication of the second set of TPMIs includes a CSI report. In some examples of the method, apparatuses, and non-transitory computer-readable medium described herein, the CSI report further includes one or more of a rank indicator, a precoding matrix indicator, or a channel quality indicator based on the determined interference metric. In some examples of the method, apparatuses, and non-transitory computer-readable medium described herein, one or more TPMIs in the second set of TPMIs may be associated with one or more of the rank indicator, the precoding matrix indicator, or the channel quality indicator. In some examples of the method, apparatuses, and non-transitory computer-readable medium described herein, the second set of TPMIs may be a subset of the first set of TPMIs.

In some examples of the method, apparatuses, and non-transitory computer-readable medium described herein, a TPMI in the second set of TPMIs may be associated with an indication of the reference signal received from the second device. In some examples of the method, apparatuses, and non-transitory computer-readable medium described herein, the indication of the second set of TPMIs includes a codepoint or a bitmap. In some examples of the method, apparatuses, and non-transitory computer-readable medium described herein, the codepoint indicates an index of a set of TPMIs in a list of sets of TPMIs. In some examples of the method, apparatuses, and non-transitory computer-readable medium described herein, a size of the list of sets of TPMIs may be equal to a combinatorial number based on selecting the second set of TPMIs from the first set of TPMIs. In some examples of the method, apparatuses, and non-transitory computer-readable medium described herein, a bin of the bitmap indicates whether a TPMI of the first set of TPMIs may be included in the second set of TPMIs, and where a mapping between the bin and the TPMI of the first set of TPMIs may be based on the position of the bin.

Some examples of the method, apparatuses, and non-transitory computer-readable medium described herein may further include operations, features, means, or instructions for receiving a data transmission from the network equipment, where the data transmission may be a full duplex communication with a transmission from the second device. Some examples of the method, apparatuses, and non-transitory computer-readable medium described herein may further include operations, features, means, or instructions for receiving the reference signal from the second device periodically.

Some examples of the method, apparatuses, and non-transitory computer-readable medium described herein may further include operations, features, means, or instructions for receiving, from the network equipment, a configuration indicating periodic CSI reporting, and transmitting the indication of the second set of TPMIs periodically based on the configuration indicating periodic CSI reporting.

Some examples of the method, apparatuses, and non-transitory computer-readable medium described herein may further include operations, features, means, or instructions for receiving an aperiodic reporting trigger, where the aperiodic reporting trigger includes the third set of TPMIs based on one or more channel characteristics associated with the second device, and transmitting the indication of the second set of TPMIs based on the aperiodic reporting trigger.

In some examples of the method, apparatuses, and non-transitory computer-readable medium described herein, the reference signal may be an SRS.

Another innovative aspect of the subject matter described in this disclosure can be implemented in a method of wireless communications at a network equipment. The method may include transmitting, to a first device, an association between a reference signal transmitted from a second device and a first set of TPMIs associated with transmissions by the second device, receiving, from the first device, an indication of a second set of TPMIs based on an interference metric corresponding to full duplex communications associated with the first device and the second device, determining a TPMI for full duplex transmissions by the second device based on receiving the indication, and transmitting an indication of the determined TPMI to the second device.

Another innovative aspect of the subject matter described in this disclosure can be implemented in an apparatus for wireless communications at a network equipment. The apparatus may include a processor, memory coupled with the processor, and instructions stored in the memory. The instructions may be executable by the processor to cause the apparatus to transmit, to a first device, an association between a reference signal transmitted from a second device and a first set of TPMIs associated with transmissions by the second device, receive, from the first device, an indication of a second set of TPMIs based on an interference metric corresponding to full duplex communications associated with the first device and the second device, determine a TPMI for full duplex transmissions by the second device based on receiving the indication, and transmit an indication of the determined TPMI to the second device.

Another innovative aspect of the subject matter described in this disclosure can be implemented in an apparatus for wireless communications at a network equipment. The apparatus may include means for transmitting, to a first device, an association between a reference signal transmitted from a second device and a first set of TPMIs associated with transmissions by the second device, receiving, from the first device, an indication of a second set of TPMIs based on an interference metric corresponding to full duplex communications associated with the first device and the second device, determining a TPMI for full duplex transmissions by the second device based on receiving the indication, and transmitting an indication of the determined TPMI to the second device.

Another innovative aspect of the subject matter described in this disclosure can be implemented in a non-transitory computer-readable medium storing code for wireless communications at a network equipment. The code may include instructions executable by a processor to transmit, to a first device, an association between a reference signal transmitted from a second device and a first set of TPMIs associated with transmissions by the second device, receive, from the first device, an indication of a second set of TPMIs based on an interference metric corresponding to full duplex communications associated with the first device and the second device, determine a TPMI for full duplex transmissions by the second device based on receiving the indication, and transmit an indication of the determined TPMI to the second device.

Some examples of the method, apparatuses, and non-transitory computer-readable medium described herein may further include operations, features, means, or instructions for determining a third set of TPMIs based on one or more channel characteristics associated with the second device, where the first set of TPMIs may be determined based on the third set of TPMIs, and transmitting, to the first device, an indication of the third set of TPMIs. In some examples of the method, apparatuses, and non-transitory computer-readable medium described herein, the third set of TPMIs may be transmitted in medium access control signaling or in DCI that may be specific to the first device. In some examples of the method, apparatuses, and non-transitory computer-readable medium described herein, the third set of TPMIs may be transmitted in DCI that may be common to the first device and one or more additional devices. Some examples of the method, apparatuses, and non-transitory computer-readable medium described herein may further include operations, features, means, or instructions for assigning a radio network temporary identifier value to the first device and the one or more additional devices, where the DCI may be addressed at the assigned radio network temporary identifier value. Some examples of the method, apparatuses, and non-transitory computer-readable medium described herein may further include operations, features, means, or instructions for transmitting, to the first device, an association between the reference signal and the third set of TPMIs.

In some examples of the method, apparatuses, and non-transitory computer-readable medium described herein, the association between the reference signal and the third set of TPMIs includes an explicit mapping. In some examples of the method, apparatuses, and non-transitory computer-readable medium described herein, the association between the reference signal and the third set of TPMIs includes an implicit mapping based on an ordering of the third set of TPMIs in a list of a set of subsets of TPMIs.

In some examples of the method, apparatuses, and non-transitory computer-readable medium described herein, the indication of the third set of TPMIs includes a codepoint or a bitmap. In some examples of the method, apparatuses, and non-transitory computer-readable medium described herein, the codepoint indicates an index of a set of TPMIs in a list of sets of TPMIs. In some examples of the method, apparatuses, and non-transitory computer-readable medium described herein, a size of the list of sets of TPMIs may be equal to a combinatorial number based on selecting the third set of TPMIs from a full set of TPMIs. In some examples of the method, apparatuses, and non-transitory computer-readable medium described herein, a bin of the bitmap indicates whether a TPMI of a full set of TPMIs may be included in the third set of TPMIs, and where a mapping between the bin and the TPMI of the full set of TPMIs may be based on the position of the bin. In some examples of the method, apparatuses, and non-transitory computer-readable medium described herein, the association between the reference signal transmitted from the second device and the first set of TPMIs includes an indication of physical resources associated with transmission of the reference signal.

Some examples of the method, apparatuses, and non-transitory computer-readable medium described herein may further include operations, features, means, or instructions for transmitting a channel state information reference signal to the first device, where the second set of TPMIs may be further based on a signal matrix associated with the channel state information reference signal.

In some examples of the method, apparatuses, and non-transitory computer-readable medium described herein, the second set of TPMIs includes TPMIs associated with SINRs that exceed a threshold. In some examples of the method, apparatuses, and non-transitory computer-readable medium described herein, the second set of TPMIs includes a configured number of TPMIs associated with highest SINRs of calculated SINRs. In some examples of the method, apparatuses, and non-transitory computer-readable medium described herein, the second set of TPMIs includes TPMIs associated with SINRs that fall below a threshold. In some examples of the method, apparatuses, and non-transitory computer-readable medium described herein, the second set of TPMIs includes a configured number of TPMIs associated with lowest SINRs of calculated SINRs.

In some examples of the method, apparatuses, and non-transitory computer-readable medium described herein, the indication of the second set of TPMIs includes a CSI report. In some examples of the method, apparatuses, and non-transitory computer-readable medium described herein, the CSI report further includes one or more of a rank indicator, a precoding matrix indicator, or a channel quality indicator based on the determined interference metric. In some examples of the method, apparatuses, and non-transitory computer-readable medium described herein, one or more TPMIs in the second set of TPMIs may be associated with one or more of the rank indicator, the precoding matrix indicator, or the channel quality indicator.

In some examples of the method, apparatuses, and non-transitory computer-readable medium described herein, the indication of the second set of TPMIs includes a codepoint or a bitmap. In some examples of the method, apparatuses, and non-transitory computer-readable medium described herein, the codepoint indicates an index of a set of TPMIs in a list of sets of TPMIs. In some examples of the method, apparatuses, and non-transitory computer-readable medium described herein, a size of the list of sets of TPMIs may be equal to a combinatorial number based on selecting the second set of TPMIs from the first set of TPMIs. In some examples of the method, apparatuses, and non-transitory computer-readable medium described herein, a bin of the bitmap indicates whether a TPMI of the first set of TPMIs may be included in the second of TPMIs, and where a mapping between the bin and the TPMI of the first set of TPMIs may be based on the position of the bin.

In some examples of the method, apparatuses, and non-transitory computer-readable medium described herein, the second set of TPMIs may be a subset of the first set of TPMIs. In some examples of the method, apparatuses, and non-transitory computer-readable medium described herein, a TPMI in the second set of TPMIs may be associated with an indication of the reference signal transmitted from the second device.

Some examples of the method, apparatuses, and non-transitory computer-readable medium described herein may further include operations, features, means, or instructions for determining a pairing of the first device and the second device based on one or more of the second set of TPMIs, one or more channel characteristics associated with the first device, or one or more channel characteristics associated with the second device. In some examples of the method, apparatuses, and non-transitory computer-readable medium described herein, the one or more channel characteristics associated with the first device include a first signal to interference plus noise ratio, and the one or more channel characteristics associated with the second device include a second signal to interference plus noise ratio. Some examples of the method, apparatuses, and non-transitory computer-readable medium described herein may further include operations, features, means, or instructions for transmitting a first data transmission to the first device, and receiving a second data transmission from the second device, where the second data transmission may be a full duplex communication with the first transmission based on the determined pairing.

Some examples of the method, apparatuses, and non-transitory computer-readable medium described herein may further include operations, features, means, or instructions for transmitting, to the first device, a configuration indicating periodic CSI reporting, and receiving the indication of the second set of TPMIs periodically based on the configuration indicating periodic CSI reporting.

Some examples of the method, apparatuses, and non-transitory computer-readable medium described herein may further include operations, features, means, or instructions for transmitting an aperiodic reporting trigger to the first device, where the aperiodic reporting trigger includes the third set of TPMIs based on one or more channel characteristics associated with the second device, and receiving the indication of the second set of TPMIs based on the aperiodic reporting trigger.

In some examples of the method, apparatuses, and non-transitory computer-readable medium described herein, the reference signal may be an SRS.

DETAILED DESCRIPTION

Figure 1:
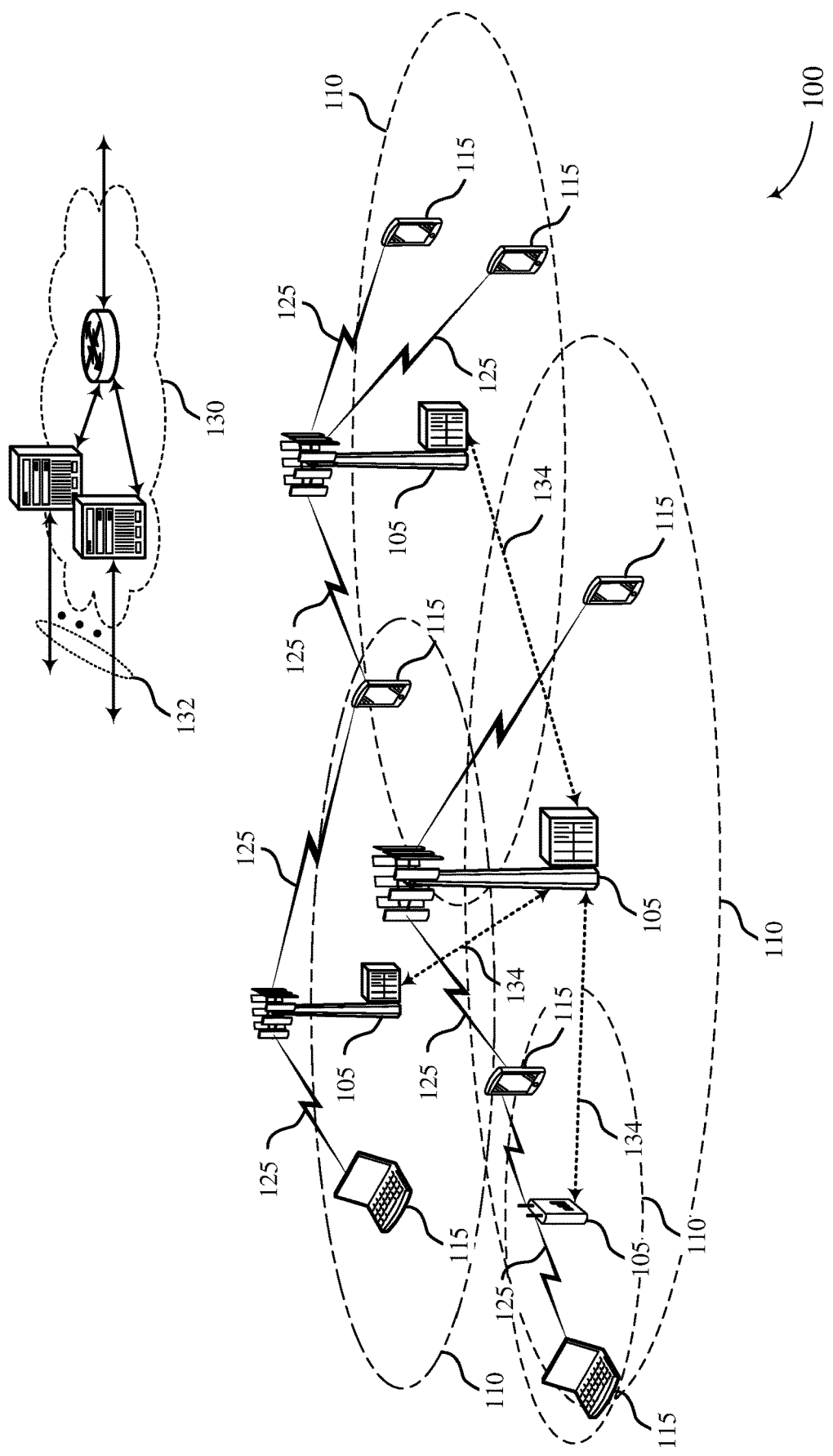
FIGS. 1 and 2 illustrate examples of a wireless communications system that supports determining transmit precoding matrix indicators based on device feedback in accordance with aspects of the present disclosure.

Some wireless communication systems, such as fifth generation (5G) systems which may be referred to as New Radio (NR) systems, may include network nodes that support full-duplex communications. A full-duplex network node, such as a base station, may transmit downlink (DL) communications to a UE concurrently with receiving uplink (UL) communications from another UE, which may have the effect of doubling link capacity for the network node. For example, a base station may pair a first UE and a second UE of multiple UEs for full-duplex communications. The base station may transmit a DL transmission to the first UE using the same time and frequency resources (for example, on a same frequency band and in a same time slot) that the base station uses to receive an UL transmission from the second UE. In another example of full-duplex communications, a relay node in a wireless communications network may communicate concurrently with an anchor node and a mobile terminal (such as a UE). Full-duplex communications may improve system throughput and reduce transfer latency for time-critical services in wireless communications networks.

Full-duplex communications may lead to interference between the concurrent transmissions. For example, if a first UE (which may be referred to as a victim UE) receiving a DL transmission from a base station is located near a second UE (which may be referred to as an aggressor UE) transmitting an UL transmission to the base station, the DL transmission signal for the first UE may suffer from co-channel interference due to the concurrent UL transmission signal from the second UE. The strength of the interference may depend on the distance between the first UE and the second UE, or on a transmission power spectrum associated with the UL transmission signal from the second UE. In some examples, such as when the first UE includes multiple receive antennas for coherent antenna reception, the strength of the interference may additionally depend on a spatial direction of the UL transmission signal from the second UE.

In some cases, the UE may be configured with a time and frequency resource for measuring interference, which may be referred to as a channel state information interference measurement (CSI-IM) resource. The base station may refrain from transmitting signals to the UE in the CSI-IM resource to allow the UE to measure interference. The UE may report the measured interference to the base station in a channel state information (CSI) report, which may include reports associated with one or more parameters of a communication channel between the base station and the UE. For example, the UE may include a non-zero power CSI reference signal (CSI-RS) associated with the CSI-IM resource in the CSI report. In some cases, measuring interference in the CSI-IM resource may not be suitable for estimating co-channel interference for full-duplex communications. For example, the UE may measure a total interference from an environment in the CSI-IM resource, but the strength of the co-channel interference may vary based on which other UE the UE is paired with in the full-duplex communications. To measure interference due to multiple distinguishable UEs, a UE may use multiple CSI-IM resources, which may reduce efficiency in a network. Additionally, a CSI-IM resource may be configured in a DL slot, and so may not be suitable for measuring interference associated with interfering UL transmissions from UEs.

In some other cases, a UE may be configured to mitigate cross link interference (CLI) by measuring interference from UEs in other cells, such as UEs associated with other base stations. A network may configure a set of sounding reference signal (SRS) resources assigned to a first UE in one cell and a second UE in a neighboring cell. In some cases, the SRS resources may be multiplexed with other signals. The network may configure the first UE to measure the strength of an SRS transmitted by the second UE. In some examples, the first UE may measure a reference signal received power (RSRP) of the SRS and transmit a received signal strength indicator (RSSI) to a base station of the cell. The RSSI may correspond to CLI between the first UE and the second UE. The base station may indicate the RSSI to a base station of the neighboring cell using a backhaul link, which may introduce latency in reporting the CLI. The network may use CLI mitigation techniques to measure interference over a relatively long duration (for example, tens of slots or hundreds of slots) and allocate non-overlapping time and frequency resources to the first UE and the second UE. However, transfer latency may reduce the effectiveness of using CLI handling techniques to compensate for interference in real time. Additionally, CLI mitigation techniques for interference between UEs in different cells may not be effective for reducing interference between UEs in the same cell, such as in full-duplex communications.

In some cases, a UE may transmit UL transmissions in a physical UL shared channel (PUSCH) using a transmission scheme based on a codebook. The codebook may be hard-coded in the UE or may be configured by a base station during an initial access phase using a high-layer message. The codebook may include multiple lists (for example, four lists) for precoding matrices, in which each list may correspond to a rank value (for example, rank one, rank two, among other examples). A transmit precoding matrix indicator (TPMI) may indicate a rank value and a codeword for a precoding matrix. The base station may indicate to the UE a TPMI and a transmission rank to use for UL transmissions, for example in a precoding information field of downlink control information (DCI). In some cases, the base station may additionally transmit to the UE an SRS resource indicator (SRI) corresponding to the TPMI in an SRI field of the DCI. The base station may determine a TPMI for the UE based on measuring an SRS from the UE.

In some cases, a base station may indirectly reduce interference in full-duplex communications based on configuring parameters for UL transmissions. The strength of interference in full-duplex communications of a first UE and a second UE may depend on the TPMI used by the second UE for UL transmissions. The first UE may generate an equivalent interference vector for UL transmissions from the second UE based on the TPMI. In some cases, the interference vector may lie in a null subspace of a channel matrix of the first UE, which may reduce the interference between UL transmissions from the second UE and DL transmissions to the first UE. In some other cases, the interference vector may lie in a signal subspace of the channel matrix of the first UE, which may lead to interference between UL transmissions transmitted by the second UE and DL transmissions to the first UE.

Techniques are described herein which may enable a network equipment such as a base station to reduce interference for DL transmissions to a first device by determining a TPMI for UL transmissions transmitted by a second device based on feedback from the first device. The first device may determine a candidate subset of possible TPMIs the second device may use for UL transmissions for full-duplex communications at the network equipment. In some examples, the base station may indicate the candidate subset to the first device in downlink control information (DCI) or medium access control (MAC) signaling, among other possibilities. In some examples, the candidate subset may be hard-coded or configured by higher-layer signaling, such as radio resource control (RRC) signaling. The first device may measure a reference signal such as a SRS transmitted from the second device to determine a preferable or unpreferable subset of TPMIs from the candidate subset based on an interference metric. The first device may indicate the preferable or unpreferable subset to the base station, for example in a CSI report.

Based on the subset indicated by the first device, the base station may determine a pairing of the first device and the second device for full-duplex communications. Additionally, the base station may determine a TPMI for the second device to use in UL transmissions. If the subset indicated by the first device includes preferable TPMIs, the base station may determine to indicate a TPMI from the preferable subset to the second device. If the subset indicated by the first device includes unpreferable TPMIs, the base station may determine to indicate a TPMI of the candidate subset to the second device that is not included in the unpreferable subset.

Aspects of the disclosure are initially described in the context of wireless communications systems. An additional example of a process flow is then discussed. Aspects of the disclosure are further illustrated by and described with reference to apparatus diagrams, system diagrams, and flowcharts that relate to determining transmit precoding matrix indicators based on device feedback.

FIG. 1 illustrates an example of a wireless communications system 100 that supports determining transmit precoding matrix indicators based on device feedback in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or an NR network. In some examples, wireless communications system 100 may support enhanced broadband communications, ultra-reliable (for example, mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (for example, macro or small cell base stations). The UEs 115 described herein may be able to communicate with various types of base stations 105 and network equipment including macro eNBs, small cell eNBs, gNBs, relay base stations, among other examples.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include UL transmissions from a UE 115 to a base station 105, or DL transmissions from a base station 105 to a UE 115. Downlink transmissions may also be called forward link transmissions while UL transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area 110 (for example, a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, among other examples, which may be implemented in various articles such as appliances, vehicles, meters, among other examples.

Some UEs 115, such as MTC or IoT devices, may be low cost or low complexity devices, and may provide for automated communication between machines (for example, via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (for example, a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (for example, according to narrowband communications). In some examples, UEs 115 may be designed to support critical functions (for example, mission critical functions), and a wireless communications system 100 may be configured to provide ultra-reliable communications for these functions.

In some examples, a UE 115 may also be able to communicate directly with other UEs 115 (for example, using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some examples, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (for example, via an S1, N2, N3, or other interface). Base stations 105 may communicate with one another over backhaul links 134 (for example, via an X2, Xn, or other interface) either directly (for example, directly between base stations 105) or indirectly (for example, via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (for example, control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (for example, radio heads and access network controllers) or consolidated into a single network device (for example, a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (for example, less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (for example, from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some examples, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some examples, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some examples, operations in unlicensed bands may be based on a carrier aggregation configuration in conjunction with component carriers operating in a licensed band (for example, LAA). Operations in unlicensed spectrum may include DL transmissions, UL transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (for example, a base station 105) and a receiving device (for example, a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (for example, the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (for example, a base station 105 or a UE 115) to shape or steer an antenna beam (for example, a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (for example, with respect to the antenna array of the transmitting device or receiving device, or with respect to some other orientation).

In one example, a base station 105 may use multiple antennas or antenna arrays to conduct beamforming operations for directional communications with a UE 115. For instance, some signals (for example synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (for example, by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (for example, a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (for example, for identifying a beam direction for subsequent transmission or reception by the UE 115), or transmitting a signal in a single direction (for example, for transmitting data to a receiving device).

A receiving device (for example, a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (for example, when receiving a data signal). The single receive beam may be aligned in a beam direction determined based at least in part on listening according to different receive beam directions (for example, a beam direction determined to have a highest signal strength, highest signal-to-noise ratio, or otherwise acceptable signal quality based at least in part on listening according to multiple beam directions).

In some examples, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some examples, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical layer, transport channels may be mapped to physical channels.

In some examples, UEs 115 and base stations 105 may support retransmissions of data to increase the likelihood that data is received successfully. HARQ feedback is one technique of increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, signal-to-noise conditions). In some examples, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (for example, depending on the length of the cyclic prefix prepended to each symbol period). Excluding the cyclic prefix, each symbol period may contain 2048 sampling periods. In some examples, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (for example, in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (for example, an evolved universal mobile telecommunication system terrestrial radio access (E-UTRA) absolute radio frequency channel number (EARFCN)), and may be positioned according to a channel raster for discovery by UEs 115. Carriers may be DL or UL (for example, in an FDD mode), or be configured to carry DL and UL communications (for example, in a TDD mode). In some examples, signal waveforms transmitted over a carrier may be made up of multiple sub-carriers (for example, using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (for example, LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (for example, synchronization signals or system information, among other examples) and control signaling that coordinates operation for the carrier. In some examples (for example, in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a DL carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (for example, between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (for example, 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (for example, set of subcarriers or RBs) within a carrier (for example, "in-band" deployment of a narrowband protocol type).

In a system employing MCM techniques, a resource element may consist of one symbol period (for example, a duration of one modulation symbol) and one subcarrier, where the symbol period and subcarrier spacing are inversely related. The number of bits carried by each resource element may depend on the modulation scheme (for example, the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (for example, spatial layers), and the use of multiple spatial layers may further increase the data rate for communications with a UE 115.

Devices of the wireless communications system 100 (for example, base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple DL component carriers and one or more UL component carriers according to a carrier aggregation configuration. Carrier aggregation may be used with both FDD and TDD component carriers.

In some examples, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some examples, an eCC may be associated with a carrier aggregation configuration or a dual connectivity configuration (for example, when multiple serving cells have a suboptimal or non-ideal backhaul link). An eCC may also be configured for use in unlicensed spectrum or shared spectrum (for example, where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (for example, to conserve power).

In some examples, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (for example, according to frequency channel or carrier bandwidths of 20, 40, 60, 80 MHz, among other examples) at reduced symbol durations (for example, 16.67 microseconds). A TTI in eCC may consist of one or multiple symbol periods. In some examples, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (for example, across the frequency domain) and horizontal (for example, across the time domain) sharing of resources.

A base station 105 (for example, a gNB in an NR system) may wish to pair UEs 115 for full-duplex communications. The base station 105 may indicate SRS resources to a first set of UEs 115, in which each SRS resource is associated with a UE 115 in a second set of UEs 115. In some examples, the base station may determine a candidate subset of TPMIs for each SRS resource and indicate the candidate subsets to the first set of UEs 115. Each UE 115 of the first set of UEs 115 may use the SRS resources to perform interference calculations and determine a subset of TPMIs associated with each SRS resource. In some examples, the determined subset of TPMIs may be a subset of the corresponding candidate subset of TPMIs indicated by the base station 105.

Each UE 115 of the first set of UEs 115 may transmit an indication of the determined subsets to the base station 105.

The base station 105 may determine one or more pairings of a UE 115 from the first of UEs 115 with a UE from the second set of UEs 115 for full-duplex communications based on the transmitted indications. For example, the base station 105 may indicate a TPMI and a set of time and frequency resources for UL transmissions to a UE 115 in the second set of UEs 115, and the base station 105 may indicate the same set of time and frequency resources for DL transmissions to a UE 115 in the first set of UEs 115. By pairing UEs 115 based on feedback (for example, the indications of the determined subsets of TPMIs), the base station 105 may configure full-duplex communications for increased data throughput while reducing interference between concurrent transmissions. The wireless communications system 100 may therefore include features for efficient data transmission while reducing data lost to interference, among other benefits.

Figure 2:
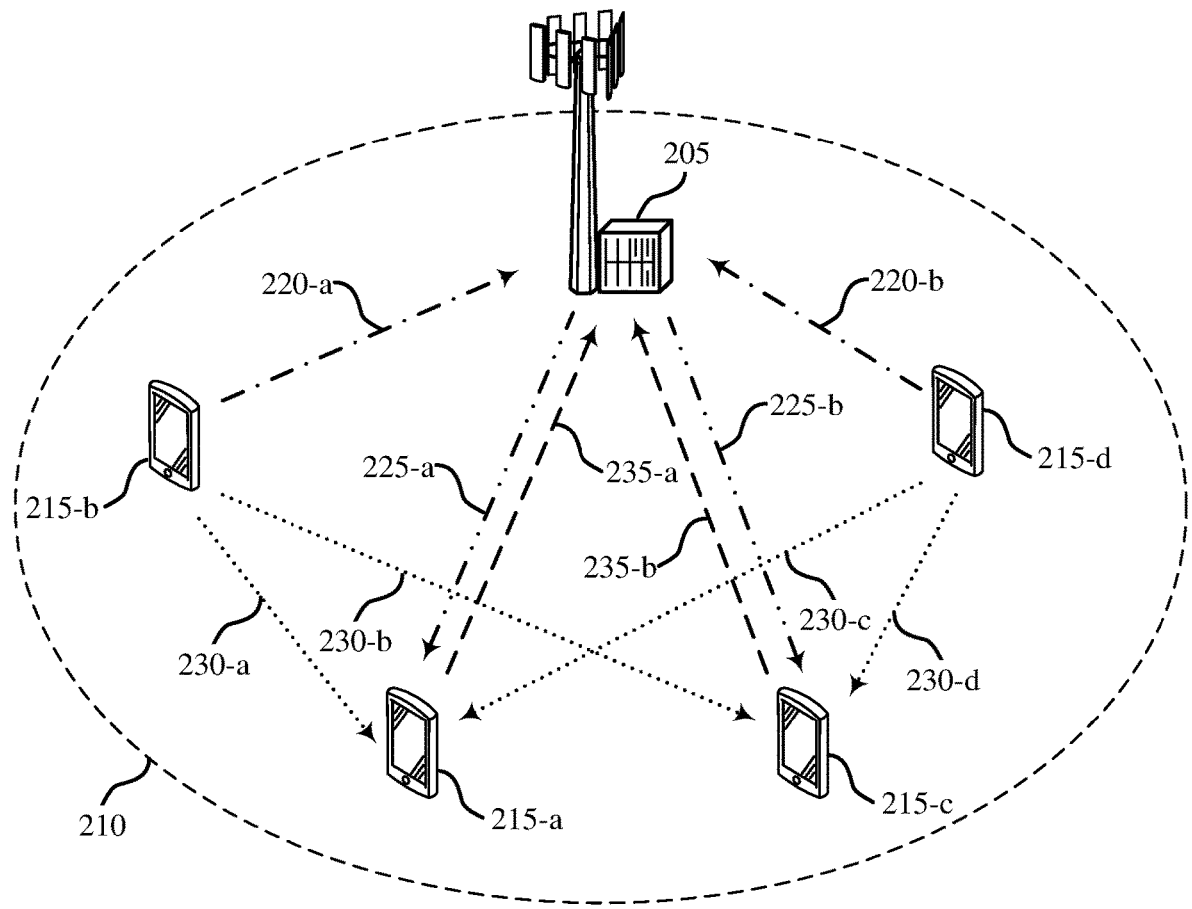
Figure 2:
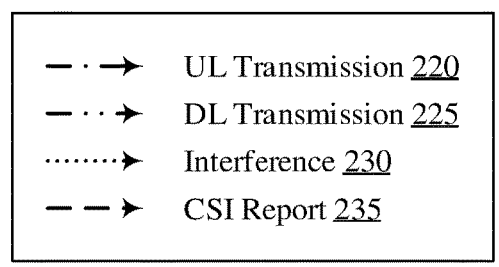

FIG. 2 illustrates an example of a wireless communications system 200 that supports determining transmit precoding matrix indicators based on device feedback in accordance with aspects of the present disclosure. In some examples, wireless communications system 200 may implement aspects of wireless communication system 100. For example, the wireless communications system 200 may include a base station 205 and UEs 215, which may be examples of the corresponding devices described with reference to FIG. 1.

The base station 205 may provide a geographic coverage area 210. The UE 215-*a* and the UE 215-*c* may be configured to receive DL transmissions 225 from the base station 205, and the UE 215-*b* and the UE 215-*d* may be configured to transmit UL transmissions 220 to the base station 205. In full-duplex communications, the UL transmissions 220 of the UE 215-*b* or the UE 215-*d* may cause interference 230 for the DL transmissions 225 of the UE 215-*a* or the UE 215-*c*. In some examples, a set of the UEs 215 (for example, the UE 215-*b* and the UE 215-*d*) may be grouped for MU-MIMO UL transmissions 220.

The base station 205 may configure physical resources (for example, time and frequency resources) for reference signal (for example, SRSs) and indicate the configured physical resources to the UEs 215. The UE 215-*b* and the UE 215-*d* may transmit SRSs in the configured physical resources, and the base station 205, the UE 215-*a*, and the UE 215-*c* may monitor for the SRSs in the configured physical resources. In some examples, the base station 205 may determine a first candidate subset of TPMIs for the UE 215-*b* and a second candidate subset of TPMIs for the UE 215-*d*, for example based on the SRSs. In some examples, the base station 205 may transmit an indication of the first candidate subset of TPMIs and the second candidate subset of TPMIs to the UE 215-*a* and the UE 215-*c*, for example in DCI or in MAC signaling. In some examples, the base station 205 may additionally transmit a CSI-RS to the UE 215-*a* and the UE 215-*c*.

The UE 215-*a* and the UE 215-*c* may determine a set of TPMIs associated with the UL transmissions 220. In some examples, the set of TPMIs associated with the UL transmissions 220 may include the first candidate subset of TPMIs and the second candidate subset of TPMIs indicated by the base station 205. In some examples, the set of TPMIs associated with the UL transmissions 220 may be hard-coded in the UE 215-*a* and the UE 215-*c*. In some other examples, the set of TPMIs associated with the UL transmissions 220 may be configured by signaling from the base station 205, such as RRC signaling.

The UE 215-*a* and the UE 215-*c* may perform interference calculations and estimate the interference 230 based on the SRSs received from the UE 215-*b* and the UE 215-*d*. For example, the UE 215-*a* may estimate an interference 230-*a* associated with the SRS received from the UE 215-*b* and an interference 230-*c* associated with the SRS received from the UE 215-*d*, and the UE 215-*c* may estimate an interference 230-*b* associated with the SRS received from the UE 215-*b* and an interference 230-*d* associated with the SRS received from the UE 215-*d*. The UE 215-*a* may determine a subset of TPMIs associated with the interference 230-*a* and a subset of TPMIs associated with the interference 230-*c*, and the UE 215-*c* may determine a subset of TPMIs associated with the interference 230-*b* and a subset of TPMIs associated with the interference 230-*d*. In some examples, the UE 215-*a* and the UE 215-*c* may determine the subsets of TPMIs based on the first candidate subset of TPMIs and the second candidate subset of TPMIs. In some examples, the subset of TPMIs associated with the interference 230-*a* and the subset of TPMIs associated with the interference 230-*b* may be subsets of the first candidate subset of TPMIs, and the subset of TPMIs associated with the interference 230-*c* and the subset of TPMIs associated with the interference 230-*d* may be subsets of the second candidate subset of TPMIs. In some examples, the UE 215-*a* and the UE 215-*c* may each estimate a signal matrix for a DL channel for DL transmissions 225 based on the CSI-RS received from the base station 205. In some examples, the UE 215-*a* and the UE 215-*c* may additionally base the determination of the subsets of TPMIs associated with the interference 230 on the estimated signal matrix. Additionally or alternatively, in some examples, the UE 215-*a* and the UE 215-*c* may base the determination of the subsets of TPMIs associated with the interference 230 on calculating a signal-to-interference-plus-noise ratio (SINR) for each TPMI in the set of TPMIs.

The UE 215-*a* and the UE 215-*c* may transmit indications of the subsets of TPMIs associated with the interference 230 to the base station 205 in CSI reports 235. Each subset of TPMIs associated with the interference 230 may include preferable TPMIs, for example TPMIs having SINRs that exceed a threshold. Additionally or alternatively, each subset of TPMIs associated with the interference 230 may include unpreferable TPMIs, for example TPMIs having SINRs that fall below a threshold. The base station 205 may determine pairings for full-duplex communications based on the indicated subsets of TPMIs received from the UE 215-*a* and the UE 215-*c*. The base station 205 may additionally determine a first TPMI for the UE 215-*b* and a second TPMI for the UE 215-*d* based on the indicated subsets of TPMIs received from the UE 215-*a* and the UE 215-*c*. For example, the base station 205 may pair the UE 215-*a* and the UE 215-*b*. The base station 205 may transmit a DL grant to the UE 215-*a* indicating a DL transmission 225-*a* is to be transmitted in a first set of physical resources. The base station 205 may additionally transmit an UL grant to the UE 215-*b* indicating that the UE 215-*b* is to transmit an UL transmission 220-*a* in the first set of physical resources. The base station 205 may also pair the UE 215-*c* and the UE 215-*d*, and transmit grants indicating a DL transmission 225-*b* and an UL transmission 220-*b* are to be transmitted concurrently in a second set of physical resources.

Figure 3:
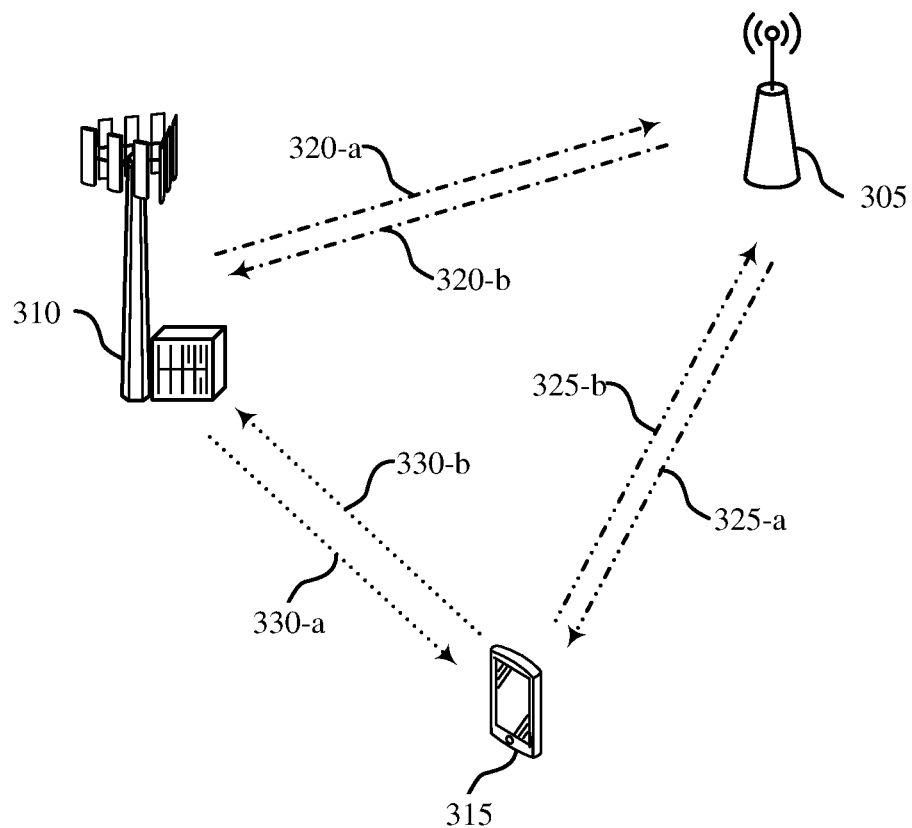
FIG. 3 illustrates an example of a wireless communications system that supports determining transmit precoding matrices based on device feedback in an integrated access and backhaul (IAB) scenario in accordance with aspects of the present disclosure.

FIG. 3 illustrates an example of a wireless communications system 300 that supports determining transmit precoding matrices based on device feedback in an integrated access and backhaul (IAB) scenario in accordance with aspects of the present disclosure. In some examples, wireless communications system 300 may implement aspects of wireless communications system 100. For example, the wireless communications system 300 may include an IAB node 305 and an IAB donor 310, which may be examples of a base station 105 described with reference to FIG. 1. The wireless communications system 300 may also include a UE 315, which may be an example of a UE 115 described with reference to FIG. 1.

The IAB node 305 may be configured as a relay node, through which data from the IAB donor 310 may be transmitted to the UE 315. The IAB node 305 may be configured to communicate with the IAB donor 310 over backhaul links 320, and the IAB node 305 may be configured to communicate with the UE 315 over access links 325. In full-duplex communications, the IAB node 305 may receive DL data from the IAB donor 310 over the backhaul link 320-$a$ in a set of physical resources, and transmit DL data to the UE 315 over the access link 325-$a$ in the same set of physical resources. Similarly, the IAB node 305 may receive UL data from the UE 315 over the access link 325-$b$ in a set of physical resources, and transmit UL data to the IAB donor 310 over the backhaul link 320-$b$ in the same set of physical resources. Full-duplex communications between backhaul links 320 and access links 325 may cause interference 330 for the device receiving data. For example, the transmission of DL data over the backhaul link 320-$a$ may cause interference 330-$a$ for the transmission of DL data over the access link 325-$a$, and the transmission of UL data over the access link 325-$b$ may cause interference 330-$b$ for the transmission of UL data over the backhaul link 320-$b$.

The IAB node 305 may configure physical resources for reference signals and indicate the configured physical resources to the IAB donor 310 and the UE 315. The UE 315 may determine a first candidate subset of transmit precoding matrices associated with the transmission of DL data over the backhaul link 320-$a$. In some examples, the first candidate subset of transmit precoding matrices may include a candidate subset of transmit precoding matrices indicated by the IAB node 305. In some examples, the first candidate subset of transmit precoding matrices may be hard-coded in the UE 315. In some examples, the first candidate subset of transmit precoding matrices may be configured by signaling from the IAB node 305, such as RRC signaling.

To reduce the interference 330-$a$, the IAB donor 310 may be configured to transmit reference signals in the configured physical resources. The UE 315 may perform interference calculations and estimate the interference 330-$a$ based on the reference signals received from the IAB donor 310. The UE 315 may determine a first preferable or unpreferable subset of transmit precoding matrices associated with the transmission of DL data over the backhaul link 320-$a$, out of the first candidate subset of transmit precoding matrices, based on the interference calculations of the interference 330-$a$.

The IAB node 305 may configure physical resources for reference signals and indicate the configured physical resources to the UE 315 and the IAB donor 310. The IAB donor 310 may determine a second candidate subset of transmit precoding matrices associated with the transmission of UL data over the access link 325-$b$. In some examples, the second candidate subset of transmit precoding matrices may include a candidate subset of transmit precoding matrices indicated by the IAB node 305. In some examples, the second candidate subset of transmit precoding matrices may be hard-coded in the IAB donor 310. In some examples, the second candidate subset of transmit precoding matrices may be configured by signaling from the IAB node 305, such as RRC signaling.

To reduce the interference 330-$b$, the UE 315 may be configured to transmit reference signals in the configured physical resources. The IAB donor 310 may perform interference calculations and estimate the interference 330-$b$ based on the reference signals received from the UE 315. The IAB donor 310 may determine a second preferable or unpreferable subset of transmit precoding matrices associated with the transmission of UL data over the access link 325-$b$, out of the second candidate subset of transmit precoding matrices, based on the interference calculations of the interference 330-$b$.

The UE 315 and the IAB donor 310 may transmit indications of the subsets of transmit precoding matrices associated with the interference 330 to the IAB node 305. Each subset of transmit precoding matrices may include the first or the second preferable or unpreferable transmit precoding matrices. The IAB node 305 may schedule full-duplex communications based on the indicated subsets of transmit precoding matrices received from the UE 315 and the IAB donor 310. For example, the IAB node 305 may transmit grants indicating the transmission of DL data over the access link 325-$a$ and the transmission of DL data over the backhaul link 320-$a$ are to be transmitted concurrently in a first set of physical resources. The IAB node 305 may also transmit grants indicating the transmission of UL data over the access link 325-$b$ and the transmission of UL data over the backhaul link 320-$b$ are to be transmitted concurrently in a second set of physical resources.

Figure 4:
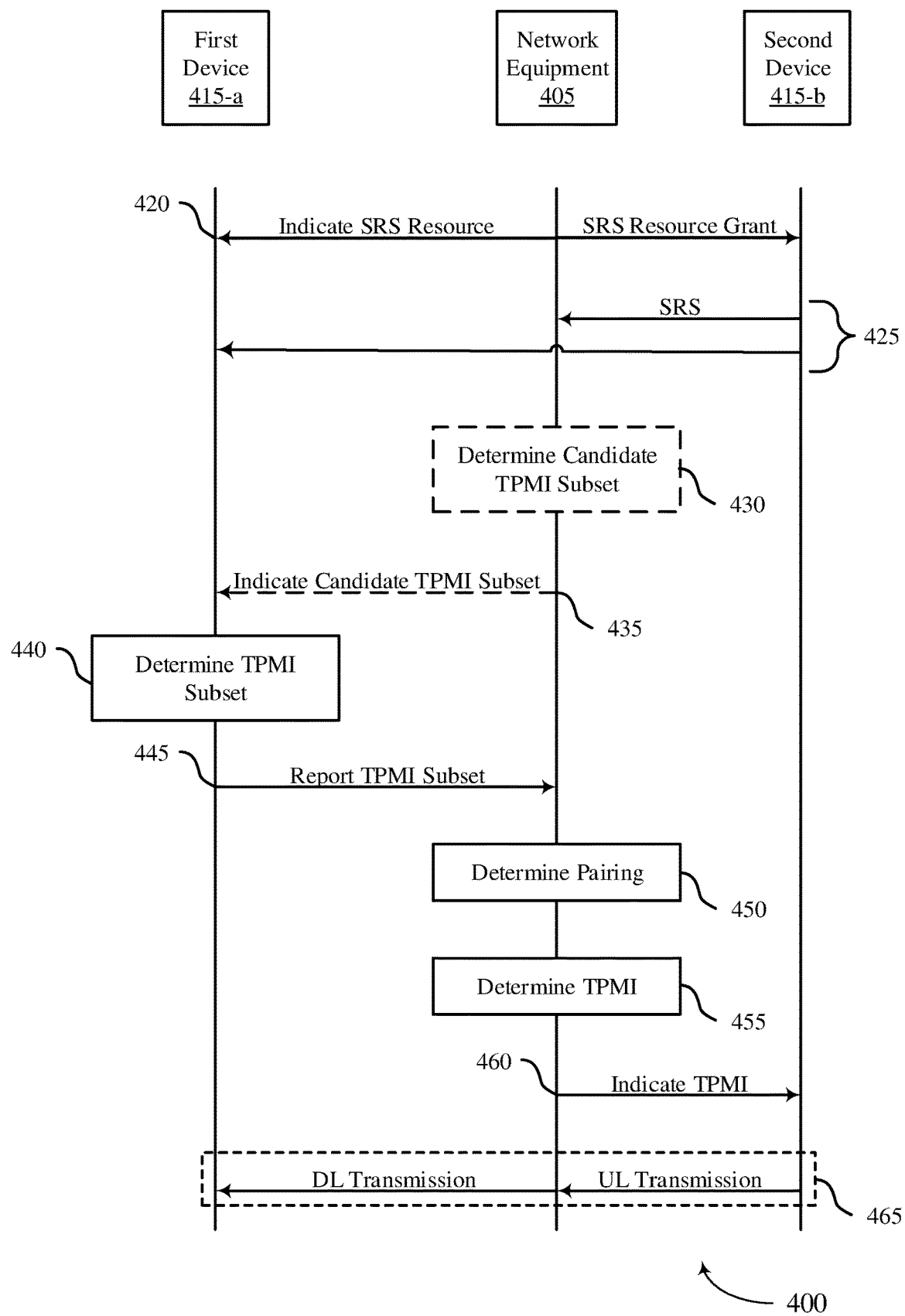
FIG. 4 illustrates an example of a process flow that supports determining transmit precoding matrix indicators for full-duplex communications based on device feedback in accordance with aspects of the present disclosure.

FIG. 4 illustrates an example of a process flow 400 that supports determining transmit precoding matrix indicators for full-duplex communications based on device feedback in accordance with aspects of the present disclosure. In some examples, the process flow 400 may implement aspects of wireless communication systems 100, 200, and 300. The process flow 400 may include a network equipment 405, which may be an example of a base station 105 described with reference to FIG. 1, a base station 205 described with reference to FIG. 2, or an IAB node 305 described with reference to FIG. 3. Process flow 400 may also include a first device 415-$a$ and a second device 415-$b$, which may be examples of a base station 105 described with reference to FIG. 1, a UE 115 described with reference to FIG. 1, a UE 215 described with reference to FIG. 2, a UE 315 described with reference to FIG. 3, or an IAB donor 310 described with reference to FIG. 3. Process flow 400 may also include one or more additional devices 415 (not shown). Alternative examples of the following may be implemented, where some steps are performed in a different order than described or are not performed at all. In some examples, steps may include additional features not mentioned below, or further steps may be added.

At 420, the network equipment 405 may transmit a grant to the second device 415-$b$ indicating configured physical resources for transmitting a reference signal such as an SRS, and indicate the configured physical resources to the first device 415-$a$. In some examples, the network equipment may configure physical resources for transmitting a reference signal other than an SRS. In some examples, the network equipment 405 may transmit a configuration indicating periodic or semi-persistent SRS transmissions, for example in high-layer signaling such as RRC signaling. The network equipment 405 may configure semi-persistent SRS transmissions by indicating the second device 415-$b$ is to transmit SRSs at regular intervals until further notice. In some other examples, the network equipment 405 may trigger aperiodic SRS transmission by transmitting a message in low-layer signaling such as DCI.

At 425, the second device 415-b may transmit the SRS on the configured physical resources. In some examples, the second device 415-b may transmit the SRS periodically or semi-persistently based on signaling from the network equipment 405. Additionally or alternatively, the second device 415-b may transmit the SRS based on receiving an aperiodic trigger from the network equipment 405. The first device 415-a and the network equipment 405 may receive the SRS on the configured physical resources.

At 430, the network equipment 405 may in some examples determine a candidate subset of TPMIs for the second device 415-b based on the transmitted SRS. Additionally or alternatively, a set of TPMIs may be hard-coded in the first device 415-a or configured by high-layer signaling. In some examples, the network equipment 405 may derive an UL channel response matrix of antennas of the second device 415-b by measuring the SRS transmitted by the antennas. The network equipment 405 may then select UL precoding codewords that match the UL channel response matrix, for example by determining which UL precoding codewords may generate SINRs that exceed a threshold. The candidate subset of TPMIs may include TPMIs associated with the selected UL precoding codewords. In some examples, a time variance of a radio channel or a scheduling of frequency subbands may lead to a dynamic selection of the candidate subset of TPMIs. The network equipment 405 may store and dynamically update the candidate subset of TPMIs based on SRS measurements and network parameters. In some examples, the network equipment 405 may determine the candidate subset of TPMIs for the second device 415-b based on a slot for UL transmissions.

When preparing for full-duplex communications, the network equipment 405 may in some examples select one or more devices, including the second device 415-b, that may be paired with the first device 415-a. At 435, the network equipment 405 may in some examples transmit to the first device 415-a an indication of the candidate subsets of TPMIs corresponding to the one or more selected devices, including the candidate subset of TPMIs corresponding to the second device 415-b. In some examples, one or more of the selected devices, including the second device 415-b, may be grouped for MU-MIMO UL transmissions. In some examples, the network equipment 405 may indicate the SRS resource associated with the candidate subset of TPMIs, as well as a power difference between the SRS and a PUSCH transmitted by the second device 415-b. In some examples, the network equipment 405 may update the candidate subsets of TPMIs over time using low-layer signaling, such as MAC CE signaling or DCI.

In some examples, the first device 415-a may receive the indication of the candidate subset of TPMIs in DCI specific to the first device 415-a. In some examples, the DCI may include a codepoint or a bitmap for each of one or more SRS resources and corresponding candidate subsets of TPMIs. In some examples, the first device 415-a may be hard-coded or configured with a full set of n possible TPMIs. In some examples, the candidate subset of TPMIs may include m TPMIs, where m≤n. In some other examples, the n possible TPMIs may include TPMIs corresponding to all possible rank values of a transmission. In some examples, the n possible TPMIs may include TPMIs corresponding to a single rank value (for example, rank one) in order to reduce signaling overhead for indicating the candidate subset of TPMIs.

A total number of possible candidate subsets of TPMIs may be represented by $C_n^m$, in which $C_n^m$ is a combinatorial number based on selecting m TPMIs out of n TPMIs. For example, $C_n^m$ may be represented by the following equation:

$$C_n^m = \frac{n!}{m!(n-m)!} \qquad \text{(Formula 1)}$$

The $C_n^m$ possible candidate subsets of TPMIs may be stored in a list, which may be hard-coded or configured for the first device 415-a. In some examples, the codepoint may link to one of the $C_n^m$ possible candidate subsets of TPMIs. The codepoint may include at least a number of bits equal to the smallest integer that is not smaller than $\log_2 C_n^m$ to represent the candidate subset of TPMIs from the list of possible candidate subsets of TPMIs whose value scope is from 0 to $C_n^m - 1$.

In some examples, the bitmap may have a length equal to n, or may include n bins. In some examples, m bins of the bitmap may be set equal to one, which may indicate the TPMIs corresponding to the m bins are in the candidate subset of TPMIs, and the remaining n−m bins may be set equal to zero, which may indicate the TPMIs corresponding to the n−m bins are not in the candidate subset of TPMIs.

In some examples, the network equipment 405 may reduce signaling overhead by dividing then possible TPMI subsets into a number of TPMI groups, in which each TPMI group may include one or more TPMIs. The codepoint or the bitmap may indicate a selection of TPMI groups rather than the selected TPMIs.

In an example, the full set of TPMIs configured for the first device 415-a may include TPMIs associated with codewords of rank 1. The total number of possible TPMIs may be n=6 for two antenna ports, or n=28 for four antenna ports. The network equipment may indicate the candidate subset of TPMIs in a "CSI request" field of DCI, such as DCI format 0-1 as described in NR standards from the organization named "3rd Generation Partnership Project" (3GPP). The "CSI request" field may include 6 bits. The DCI may include the $C_n^m$ values of codepoints to indicate the candidate subset of TPMIs. The number m of possible TPMIs in the candidate subset of TPMIs may be determined such that $\log_2 C_n^m \leq 6$ in order to indicate the candidate subset of TPMIs in the "CSI request" field of the DCI.

In some other examples, the first device 415-a may receive the indication of the candidate subset of TPMIs in group-common DCI. Group-common DCI may refer to DCI that is common to the first device 415-a and one or more additional devices configured in a group with the first device 415-a and configured to receive DL transmissions in full-duplex communications. The group-common DCI may include codepoints for candidate subsets of TPMIs for one or more SRS resources, where each SRS resource is associated with a device configured to transmit UL transmissions, such as the second device 415-b.

In some examples, each codepoint may be explicitly associated with an SRI corresponding to an SRS resource. For example, if N codepoints for candidate subsets of TPMIs are to be indicated, the DCI may include an indication of a first SRI, followed by an indication of a first codepoint associated with a first SRS resource, followed by an indication of a second SRI, followed by an indication of a second codepoint associated with a second SRS resource, up to an indication of an Nth SRI, followed by an indication of an Nth codepoint associated with an Nth SRS resource.

In some other examples, the correspondence between codepoints and SRS resources may be implicitly indicated by an order of the codepoints in the group-common DCI. For example, if N codepoints for candidate subsets of TPMIs are to be indicated, the DCI may include an indication of a first codepoint, followed by an indication of a second codepoint, up to an indication of an Nth codepoint, where the order of the codepoints indicates the first codepoint is associated with a first SRS resource, the second codepoint is associated with a second SRS resource, up to the Nth codepoint, which is associated with an Nth SRS resource.

In some examples, the group-common DCI may be addressed to a radio network temporary identifier (RNTI) value. The network equipment 405 may assign the RNTI value in advance to the first device 415-a and the one or more additional devices configured to receive DL transmissions in full-duplex communications. In some examples, the network equipment 405 may transmit the group-common DCI in a physical DL control channel (PDCCH). The group-common DCI may indicate the candidate subset of TPMIs to all the devices assigned the RNTI value in a single PDCCH, which may reduce signaling overhead compared to indicating the candidate subset of TPMIs to each device in DCI specific to the device. In scenarios using group-common DCI, the network equipment 405 may instruct the first device 415-a to monitor the assigned RNTI value and the group-common DCI in addition to monitoring an RNTI value and DCI specific to the first device 415-a.

At 440, the first device 415-a may determine a subset of TPMIs based on an interference calculation. In some examples, the interference calculation may include calculating an interference matrix associated with the received SRS. The interference matrix may correspond to interference between UL transmissions from the second device 415-b and DL transmissions to the first device 415-a. In some examples, the determined subset of TPMIs may be a subset of the candidate subset of TPMIs received from the network equipment 405. In some examples, determining the subset of TPMIs from the candidate subset of TPMIs may improve a selection accuracy of the determined subset of TPMIs In some examples, the determined subset of TPMIs may be a subset of the set of TPMIs hard-coded or configured for the first device 415-a.

In some examples, the first device 415-a may calculate a number of equivalent interference matrices by multiplying each codeword in a set of TPMIs (for example, the candidate subset of TPMIs) with the calculated interference matrix associated with the received SRS. The first device 415-a may then select a number of TPMIs based on the equivalent interference matrices and an associated SINR threshold. In some examples, the first device 415-a may select the TPMIs associated with equivalent interference matrices that exceed the SINR threshold, and the determined subset of TPMIs may include preferable TPMIs. In some other examples, the first device 415-a may select the TPMIs associated with equivalent interference matrices that fall below the SINR threshold, and the determined subset of TPMIs may include unpreferable TPMIs. In some other examples, the first device 415-a may determine the determined subset of TPMIs is to include a fixed number m' of TPMIs, and the first device 415-a may select the m' TPMIs with the highest SINR values (for example, the preferable TPMIs) or the lowest SINR values (for example, the unpreferable TPMIs). In some examples, the number m' of TPMIs the determined subset of TPMIs is to include may be hard-coded or configured for the first device 415-a.

In some examples, the first device 415-a may measure a reference signal (for example, a CSI-RS) from the network equipment 405 to estimate a signal matrix for a DL channel. In some such examples, the first device 415-a may further base the determination of the subset of TPMIs based on the estimated signal matrix. In some examples, the first device 415-a may calculate one or more of a rank indicator (RI), a precoding matrix indicator (PMI), and a channel quality indicator (CQI) based on the interference calculation.

At 445, the first device 415-a may transmit an indication of the determined subset of TPMIs to the network equipment 405. In some examples, such as when the network equipment 405 selects one or more devices, including the second device 415-b, that may be paired with the first device 415-a for full-duplex communications, the first device 415-a may transmit an indication that the determined subset of TPMIs is associated with the SRS received from the second device 415-b. In some examples, the determined subset of TPMIs may be empty, which may indicate that all of the TPMIs (for example, of the candidate set of TPMIs) are preferable, or which may indicate that none of the TPMIs are preferable.

In some examples, the first device 415-a may transmit the indication in a CSI report. In some examples, such as when the determined subset does not include a fixed number of TPMIs, transmitting the indication of the determined subset of the candidate subset of TPMIs may consume less signaling overhead in the CSI report compared to transmitting the indication of the determined subset of the full set of TPMIs. The first device 415-a may transmit the CSI report periodically or semi-persistently based on signaling from the network equipment 405. In some other examples, the first device 415-a may transmit the CSI report based on receiving an aperiodic trigger in signaling from the network device 405. In some examples, the first device 415-a may additionally transmit one or more of the RI, the PMI, and the CQI in the CSI report. In some examples, the CSI report may include a codepoint or a bitmap indicating the determined subset of TPMIs.

In some examples, such as when the determined subset of TPMIs includes the fixed number m' of TPMIs, a total number of possible determined subsets of TPMIs may be represented by $C_m^{m'}$, in which $C_m^{m'}$ is a combinatorial number based on selecting m' TPMIs out of the set of m possible candidate TPMIs. The $C_m^{m'}$ possible determined subsets of TPMIs may be stored in a list, which may be hard-coded or configured for the network equipment 405. In some examples, the codepoint may link to one of the $C_m^{m'}$ possible determined subsets of TPMIs. The codepoint may include at least a number of bits equal to the smallest integer that is not smaller than $\log_2 C_m^{m'}$ to represent the determined subset of TPMIs from the list of possible determined subsets of TPMIs. In some examples, the determined subset of TPMIs may include at most m' TPMIs, in which m' is an upper limit rather than a fixed number. In such examples, the total number of possible determined subsets may be represented by a sum $\Sigma_{l=0}^{m'} C_m^l$, and the codepoint may include at least a number of bits equal to the smallest integer that is not smaller than $\log_2 \Sigma_{l=0}^{m'} C_m^l$ or $\Sigma_{l=0}^{m'} \log_2 C_m^l$.

In some examples, the bitmap may have a length equal to m, or may include m bins. In some examples, m' bins of the bitmap may be set equal to one, which may indicate the TPMIs corresponding to the m' bins are in the determined subset of TPMIs, and the remaining m–m' bins may be set equal to zero, which may indicate the TPMIs corresponding to the m–m' bins are not in the determined subset of TPMIs.

At 450, the network equipment 405 may determine to pair the first device 415-a and the second device 415-b (or potentially another device configured for UL transmissions) based on the determined subset of TPMIs. In some examples, the network equipment 405 may additionally determine the pairing based on measuring an UL channel matrix of the second device 415-*b*. In some examples, if the determined subset of TPMIs includes preferable TPMIs, the network equipment 405 may multiply each codeword in the preferable subset of TPMIs with the UL channel matrix to determine equivalent UL channel matrices for each TPMI. The network equipment 405 may calculate a receiving SINR value based on each equivalent UL channel matrix and determine whether a largest SINR value exceeds a threshold. If the largest SINR value exceeds the threshold, the network equipment 405 may pair the first device 415-*a* and the second device 415-*b* for full-duplex communications. In some examples, if the determined subset of TPMIs includes unpreferable TPMIs, the network equipment 405 may omit the determined subset of TPMIs from the n possible TPMIs and then calculate the largest SINR value for the remaining TPMIs.

In some examples, such as when the n possible TPMIs include TPMIs corresponding to a single rank value (for example, rank one), the network equipment 405 may calculate a mapping for TPMIs corresponding to all possible rank values of the transmission for a PUSCH grant. In some examples, if all precoding vectors of a first multi-rank codeword are included in the preferable TPMI subset, the network equipment 405 may determine the TPMIs associated with the first multi-rank codeword are preferable TPMIs for the first device 415-*a*. In some examples, if a precoding vector of a second multi-rank codeword is included in the unpreferable TPMI subset, the network equipment 405 may determine the TPMI associated with the second multi-rank codeword are unpreferable TPMIs for the first device 415-*a*.

At 455, the network equipment 405 may select a TPMI for the second device 415-*a*. In some examples, the network equipment 405 may select the TPMI associated with the largest SINR value of the preferable TPMIs. In some examples, the network equipment 405 may select the TPMI associated with one or more of a largest UL receiving SINR value and a largest DL receiving SINR value.

At 460, the network equipment 405 may indicate the selected TPMI to the second device 415-*b*, for example in a grant for UL transmission in a PUSCH. At 465, the network equipment 405 may configure full-duplex communications for the first device 415-*a* and the second device 415-*b*. The network equipment 305 may transmit a grant to the second device 315-*b* granting a set of physical resources to the second device 315-*b* for an UL transmission. The network equipment 305 may transmit a grant to the first device 315-*a* scheduling a DL transmission in the same set of physical resources used for the UL transmission from the second device 315-*b*. The first device 315-*a* may receive the DL transmission in a physical downlink shared channel (PDSCH), and the second device 315-*a* may transmit the UL transmission in the PUSCH.

Figure 5:
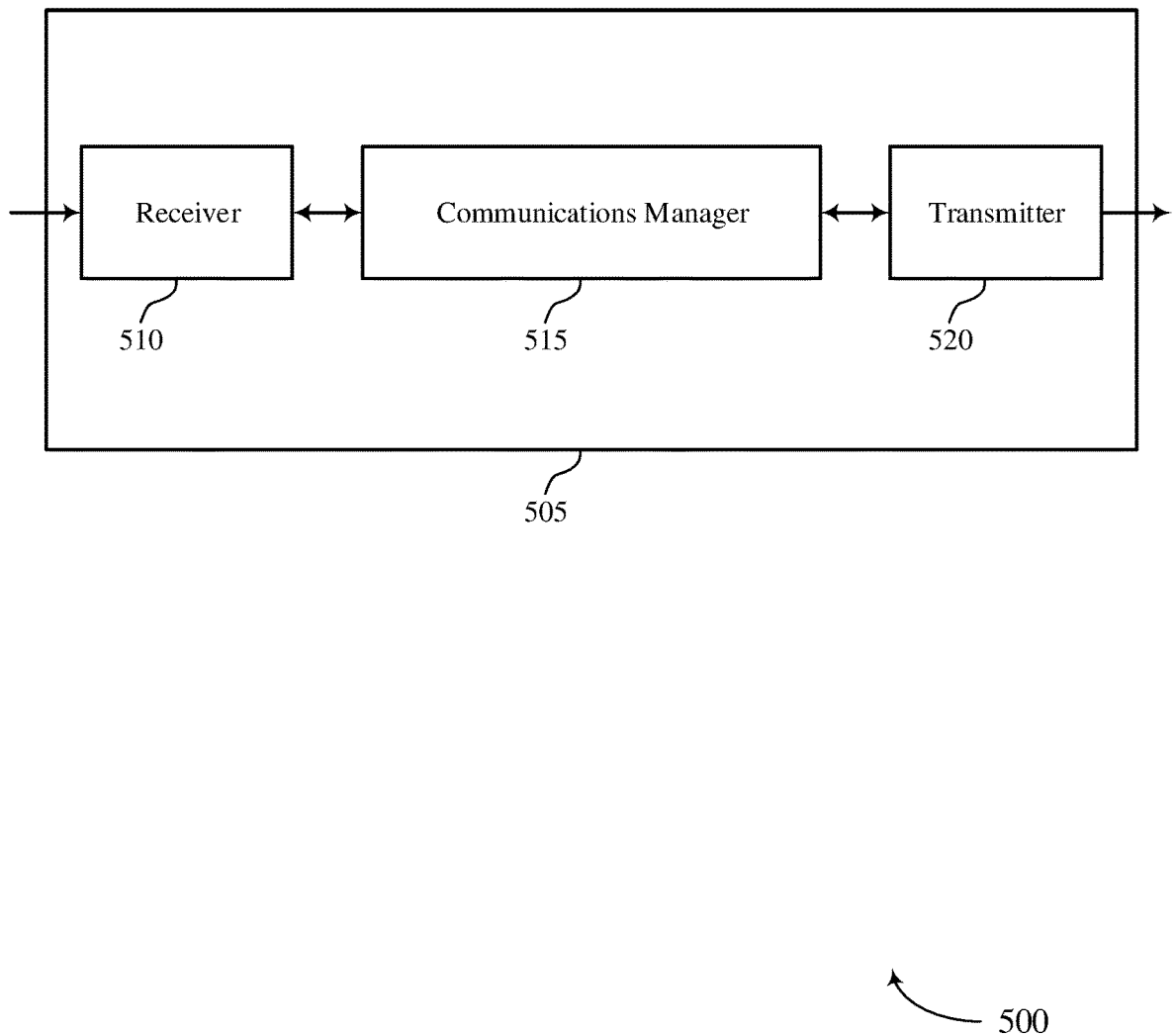
FIGS. 5 and 6 show block diagrams of devices that support determining transmit precoding matrix indicators based on device feedback in accordance with aspects of the present disclosure.

FIG. 5 shows a block diagram 500 of a device 505 that supports determining transmit precoding matrix indicators based on device feedback in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (for example, via one or more buses).

The receiver 510 may receive information such as packets, user data, or control information associated with various information channels (for example, control channels, data channels, and information related to determining TPMIs based on device feedback, among other examples). Information may be passed on to other components of the device 505. The receiver 510 may be an example of aspects of the transceiver 820 described with reference to FIG. 8. The receiver 510 may utilize a single antenna or a set of antennas.

The communications manager 515 may determine a first set of TPMIs associated with transmissions by a second device, receive a reference signal from the second device, determine an interference metric corresponding to full-duplex communications associated with the first device and the second device based on receiving the reference signal, determine a second set of TPMIs from the first set of TPMIs based on the determined interference metric, and transmit, to a network equipment, an indication of the second set of TPMIs. The actions performed by the communications manager 515 as described herein may be implemented to realize one or more potential advantages. One implementation may allow a device to save power and increase battery life by communicating with a network equipment more efficiently. For example, a UE 115 may more efficiently obtain information transmitted by a base station 105 in a DL transmission of the full-duplex communications, as the UE 115 may be able to indicate a TPMI subset that may reduce interference at the UE 115. In such examples, the UE 115 may increase the likelihood of a successful decoding procedure of the DL transmission by reducing interference with UL transmissions from a second UE 115. Another implementation may provide improved quality and reliability of service at the UE 115, as latency and the number of separate resources allocated to a group of UEs including the UE 115 may be reduced. The communications manager 515 may be an example of aspects of the communications manager 810 described herein.

The communications manager 515, or its sub-components, may be implemented in hardware, code (for example, software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at different locations, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
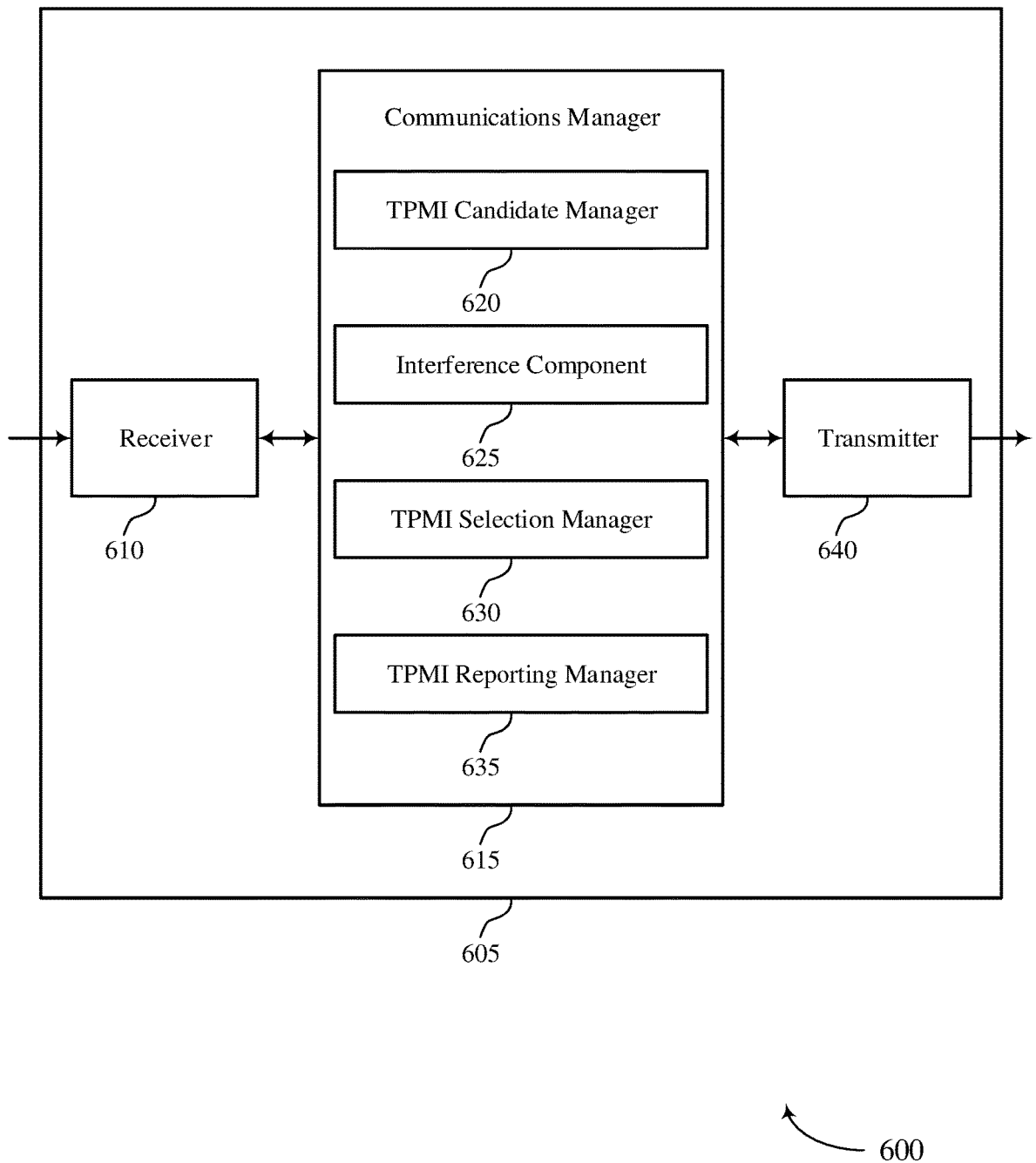

FIG. 6 shows a block diagram 600 of a device 605 that supports determining transmit precoding matrix indicators based on device feedback in accordance with aspects of the present disclosure. The device 605 may be an example of aspects of a device 505, or a UE 115 as described herein. The device 605 may include a receiver 610, a communications manager 615, and a transmitter 640. The device 605 may also include a processor. Each of these components may be in communication with one another (for example, via one or more buses).

The receiver 610 may receive information such as packets, user data, or control information associated with various information channels (for example, control channels, data channels, and information related to determining TPMIs based on device feedback, among other examples). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a TPMI candidate manager 620, an interference component 625, a TPMI selection manager 630, and a TPMI reporting manager 635. The communications manager 615 may be an example of aspects of the communications manager 810 described herein.

The TPMI candidate manager 620 may determine a first set of TPMIs associated with transmissions by a second device.

The interference component 625 may receive a reference signal from the second device and determine an interference metric corresponding to full-duplex communications associated with the first device and the second device based on receiving the reference signal.

The TPMI selection manager 630 may determine a second set of TPMIs from the first set of TPMIs based on the determined interference metric.

The TPMI reporting manager 635 may transmit, to a network equipment, an indication of the second set of TPMIs.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
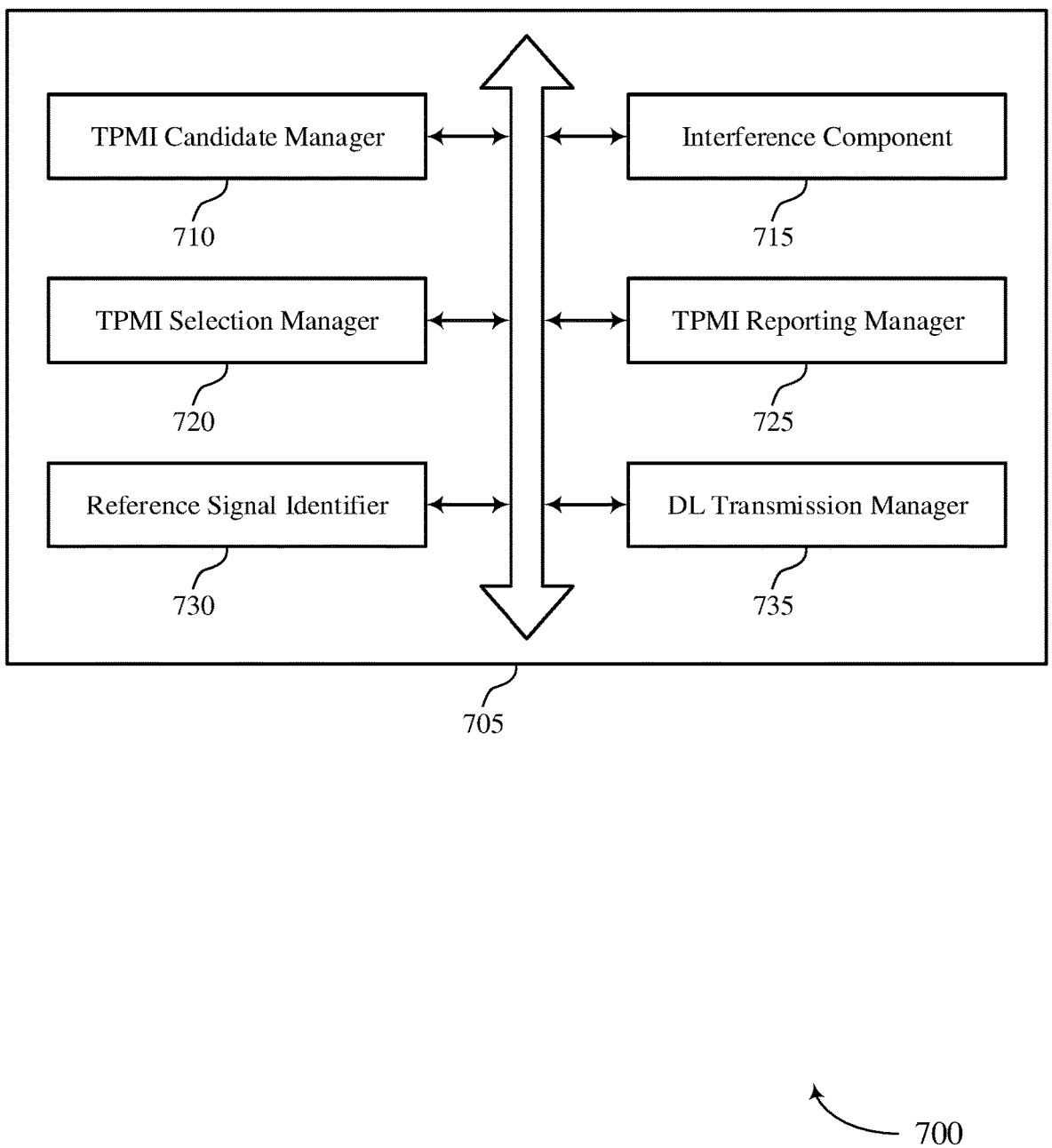
FIG. 7 shows a block diagram of a communications manager that supports determining transmit precoding matrix indicators based on device feedback in accordance with aspects of the present disclosure.

FIG. 7 shows a block diagram 700 of a communications manager 705 that supports determining transmit precoding matrix indicators based on device feedback in accordance with aspects of the present disclosure. The communications manager 705 may be an example of aspects of a communications manager 515, a communications manager 615, or a communications manager 810 described herein. The communications manager 705 may include a TPMI candidate manager 710, an interference component 715, a TPMI selection manager 720, a TPMI reporting manager 725, a reference signal identifier 730, and a DL transmission manager 735. Each of these modules may communicate, directly or indirectly, with one another (for example, via one or more buses).

The TPMI candidate manager 710 may determine a first set of TPMIs associated with transmissions by a second device. In some examples, the TPMI candidate manager 710 may receive an indication of a third set of TPMIs based on one or more channel characteristics associated with the second device, where the first set of TPMIs is determined based on receiving the indication of the third set of TPMIs. In some examples, the TPMI candidate manager 710 may receive an aperiodic reporting trigger, in which the aperiodic reporting trigger includes a third set of TPMIs based on one or more channel characteristics associated with the second device. In some examples, the third set of TPMIs may be received in MAC signaling or in DCI that is specific to the first device. In some examples, the third set of TPMIs may be received in DCI that is common to the first device and one or more additional devices.

In some examples, the indication of the third set of TPMIs may include a codepoint or a bitmap. In some examples, the codepoint may indicate an index of a set of TPMIs in a list of sets of TPMIs. In some examples, a size of the list of sets of TPMIs may be equal to a combinatorial number based on selecting the third set of TPMIs from a full set of TPMIs. In some examples, a bin of the bitmap may indicate whether a TPMI of a full set of TPMIs is included in the third set of TPMIs. In some examples, a mapping between the bin and the TPMI of the full set of TPMIs is based on the position of the bin. In some examples, the first set of TPMIs may be hard-coded at the first device or statically configured by high-layer signaling. In some examples, the TPMI candidate manager 710 may determine a fourth set of TPMIs associated with transmissions of a third device.

The interference component 715 may receive a reference signal from the second device and determine an interference metric corresponding to full-duplex communications associated with the first device and the second device based on receiving the reference signal. In some examples, determining the interference metric may include determining an interference matrix. In some examples, the interference component 715 may receive a second reference signal from the third device device and determine a second interference metric corresponding to full-duplex communications associated with the first device and the third device based on receiving the second reference signal. In some examples, the interference component 715 may calculate an SINR associated with each TPMI of the first set of TPMIs based on the determined interference metric.

The TPMI selection manager 720 may determine a second set of TPMIs based on the first set of TPMIs and the determined interference metric. In some examples, the TPMI selection manager 720 may determine a fifth set of TPMIs based on the fourth set of TPMIs and the second interference metric. In some examples, determining the second set of TPMIs is further based on the determined signal matrix. In some examples, the second set of TPMIs may include TPMIs associated with SINRs that exceed a threshold. In some examples, the second set of TPMIs may include a configured number of TPMIs associated with highest SINRs of the calculated SINRs. In some examples, the second set of TPMIs may include TPMIs associated with SINRs that fall below a threshold. In some examples, the second set of TPMIs may include a configured number of TPMIs associated with lowest SINRs of the calculated SINRs. In some examples, the second set of TPMIs may be a subset of the first set of TPMIs.

The TPMI reporting manager 725 may transmit, to a network equipment, an indication of the second set of TPMIs. In some examples, the TPMI reporting manager 725 may transmit, to the network equipment, an indication of the fifth set of TPMIs. In some examples, the second device and the third device may be grouped for uplink MU-MIMO transmission. In some examples, the TPMI reporting manager 725 may receive, from the network equipment, a configuration indicating periodic CSI reporting. In some examples, the TPMI reporting manager 725 may transmit the indication of the second set of TPMIs periodically based on the configuration indicating periodic CSI reporting. In some examples, the TPMI reporting manager 725 may transmit the indication of the second set of TPMIs based on the aperiodic reporting trigger.

In some examples, the indication of the second set of TPMIs includes a CSI report. In some examples, the CSI report further includes one or more of an RI, a PMI, or a CQI based on the determined interference metric. In some examples, one or more TPMIs in the second set of TPMIs are associated with one or more of the RI, the PMI, or the CQI.

In some examples, the indication of the second set of TPMIs includes a codepoint or a bitmap. In some examples, the codepoint indicates an index of a set of TPMIs in a list of sets of TPMIs. In some examples, a size of the list of sets of TPMIs is equal to a combinatorial number based on selecting the second set of TPMIs from the first set of TPMIs. In some examples, a bin of the bitmap indicates whether a TPMI of the first set of TPMIs is included in the second set of TPMIs, and where a mapping between the bin and the TPMI of the first set of TPMIs is based on the position of the bin.

The reference signal identifier 730 may receive, from the network equipment, an association between the reference signal received from the second device and the third set of TPMIs. In some examples, the reference signal identifier 730 may receive a CSI-RS from the network equipment. In some examples, the reference signal identifier 730 may determine a signal matrix for transmissions from the network equipment based on the CSI-RS. In some examples, the reference signal identifier 730 may receive the reference signal from the second device periodically. In some examples, the association includes an indication of physical resources associated with transmission of the reference signal.

In some examples, the association between the reference signal received from the second device and the third set of TPMIs includes an explicit mapping. In some examples, the association between the reference signal received from the second device and the third set of TPMIs includes an implicit mapping based on an ordering of the third set of TPMIs in a list of a set of subsets of TPMIs. In some examples, a TPMI in the second set of TPMIs is associated with an indication of the reference signal received from the second device. In some examples, the reference signal is an SRS.

The DL transmission manager 735 may receive a data transmission from the network equipment, where the data transmission is a full-duplex communication with a transmission from the second device.

Figure 8:
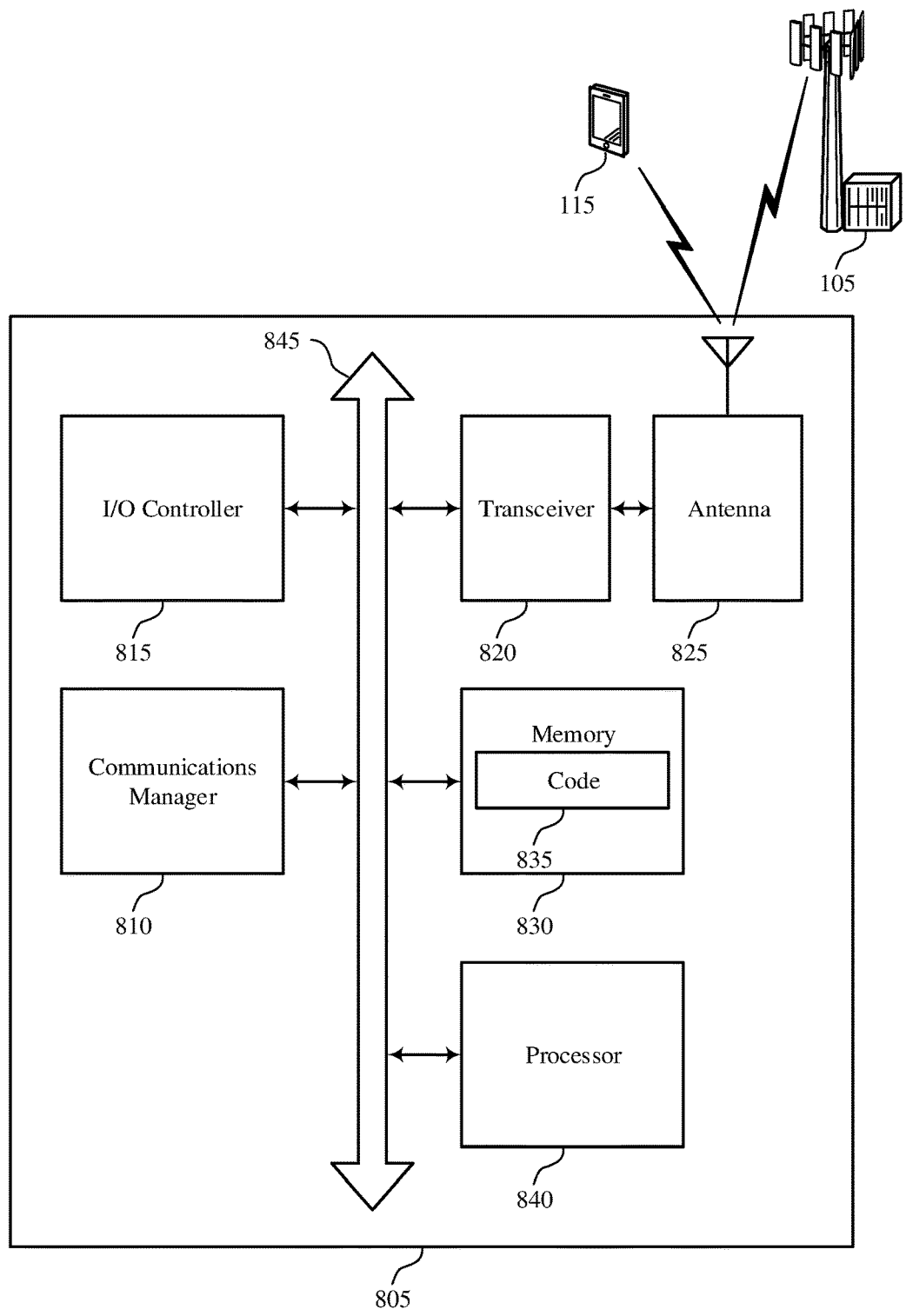
FIG. 8 shows a diagram of a system including a device that supports determining transmit precoding matrix indicators based on device feedback in accordance with aspects of the present disclosure.

FIG. 8 shows a diagram of a system 800 including a device 805 that supports determining transmit precoding matrix indicators based on device feedback in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (for example, bus 845).

The communications manager 810 may determine a first set of TPMIs associated with transmissions by a second device, receive a reference signal from the second device, determine an interference metric corresponding to full-duplex communications associated with the first device and the second device based on receiving the reference signal, determine a second set of TPMIs from the first set of TPMIs based on the determined interference metric, and transmit, to a network equipment, an indication of the second set of TPMIs.

The I/O controller 815 may manage input and output signals for the device 805. The I/O controller 815 may also manage peripherals not integrated into the device 805. In some examples, the I/O controller 815 may represent a physical connection or port to an external peripheral. In some examples, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some examples, the I/O controller 815 may be implemented as part of a processor. In some examples, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some examples, the wireless device may include a single antenna 825. However, in some examples the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some examples, the memory 830 may contain, among other things, a basic input/output system (BIOS) which may control basic hardware or software operation such as the interaction with peripheral components or devices.

The processor 840 may include an intelligent hardware device (for example, a general-purpose processor, a DSP, a central processing unit (CPU), a microcontroller, an ASIC, an FPGA, a programmable logic device, a discrete gate or transistor logic component, a discrete hardware component, or any combination thereof). In some examples, the processor 840 may be configured to operate a memory array using a memory controller. In other cases, a memory controller may be integrated into the processor 840. The processor 840 may be configured to execute computer-readable instructions stored in a memory (for example, the memory 830) to cause the device 805 to perform various functions (for example, functions or tasks supporting determining TPMIs based on device feedback).

Based on determining a subset of TPMIs, the processor 840 (for example, controlling the receiver 510, the transmitter 520, or the transceiver 820) may reliably obtain DL transmissions in full-duplex communications with a network equipment. Further, the processor 840 may transmit the subset of TPMIs and monitor for subsequent DL transmissions. The processor 840 may turn on one or more processing units for monitoring the subsequent DL transmissions, increase a processing clock, or a similar mechanism within the device 805. As such, when the subsequent DL transmission is received, the processor may be ready to respond more efficiently through the reduction of a ramp up in processing power.

The code 835 may include instructions to implement aspects of the present disclosure, including instructions to support wireless communications. The code 835 may be stored in a non-transitory computer-readable medium such as system memory or other type of memory. In some examples, the code 835 may not be directly executable by the processor 840 but may cause a computer (for example, when compiled and executed) to perform functions described herein.

Figure 9:
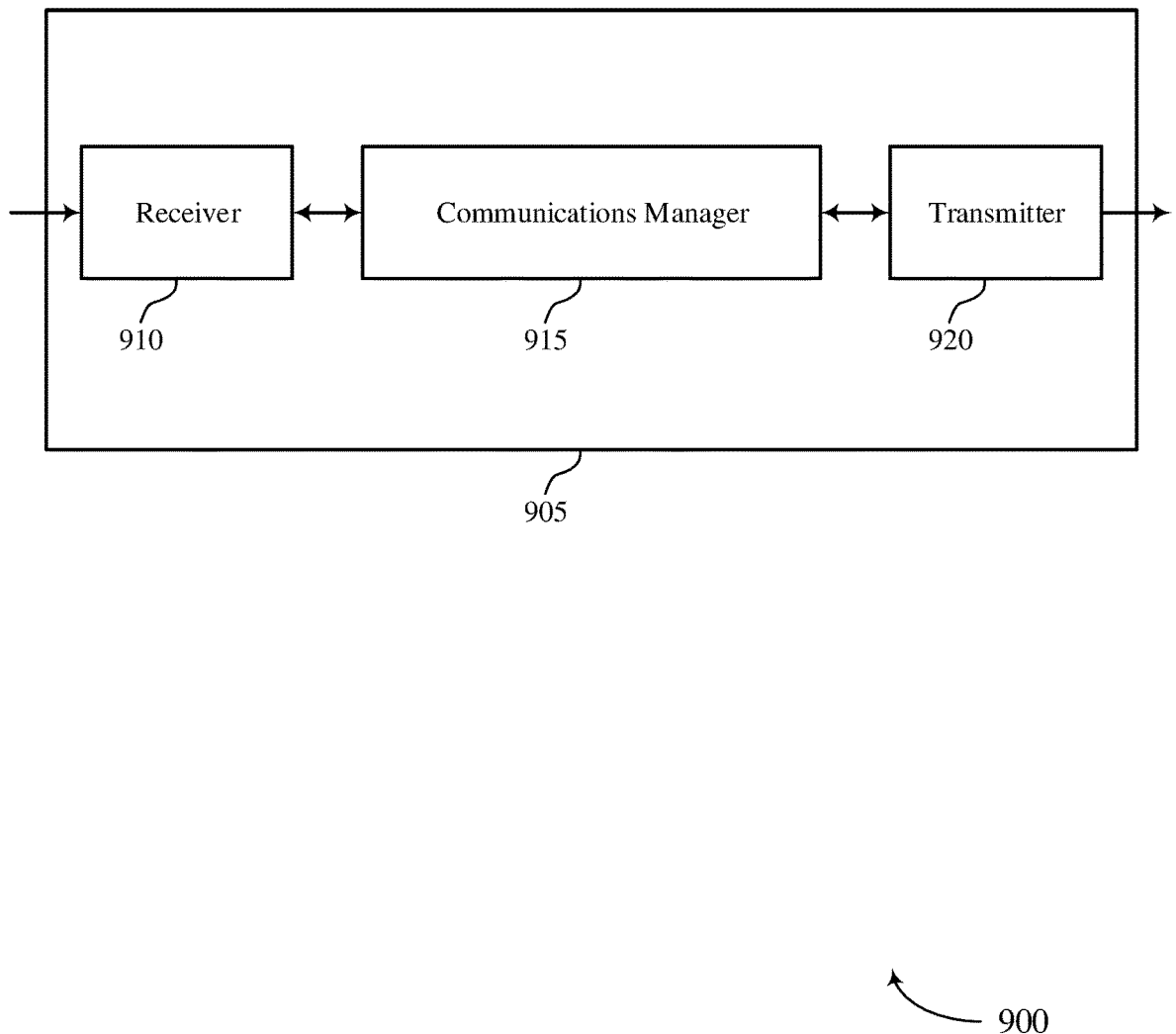
FIGS. 9 and 10 show block diagrams of devices that support determining transmit precoding matrix indicators based on device feedback in accordance with aspects of the present disclosure.

FIG. 9 shows a block diagram 900 of a device 905 that supports determining transmit precoding matrix indicators based on device feedback in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (for example, via one or more buses).

The receiver 910 may receive information such as packets, user data, or control information associated with various information channels (for example, control channels, data channels, and information related to determining TPMIs based on device feedback, among other examples). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit, to a first device, an association between a reference signal transmitted from a second device and a first set of TPMIs associated with transmissions by the second device, receive, from the first device, an indication of a second set of TPMIs based on an interference metric corresponding to full-duplex communications associated with the first device and the second device, determine a TPMI for full-duplex transmissions by the second device based on receiving the indication, and transmit an indication of the determined TPMI to the second device. The communications manager 915 may be an example of aspects of the communications manager 1210 described herein.

The communications manager 915, or its sub-components, may be implemented in hardware, code (for example, software or firmware) executed by a processor, or any combination thereof. If implemented in code executed by a processor, the functions of the communications manager 915, or its sub-components may be executed by a general-purpose processor, a DSP, an ASIC, an FPGA, or other programmable logic device, discrete gate or transistor logic, discrete hardware components, or any combination thereof designed to perform the functions described in the present disclosure.

The communications manager 915, or its sub-components, may be physically located at different locations, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
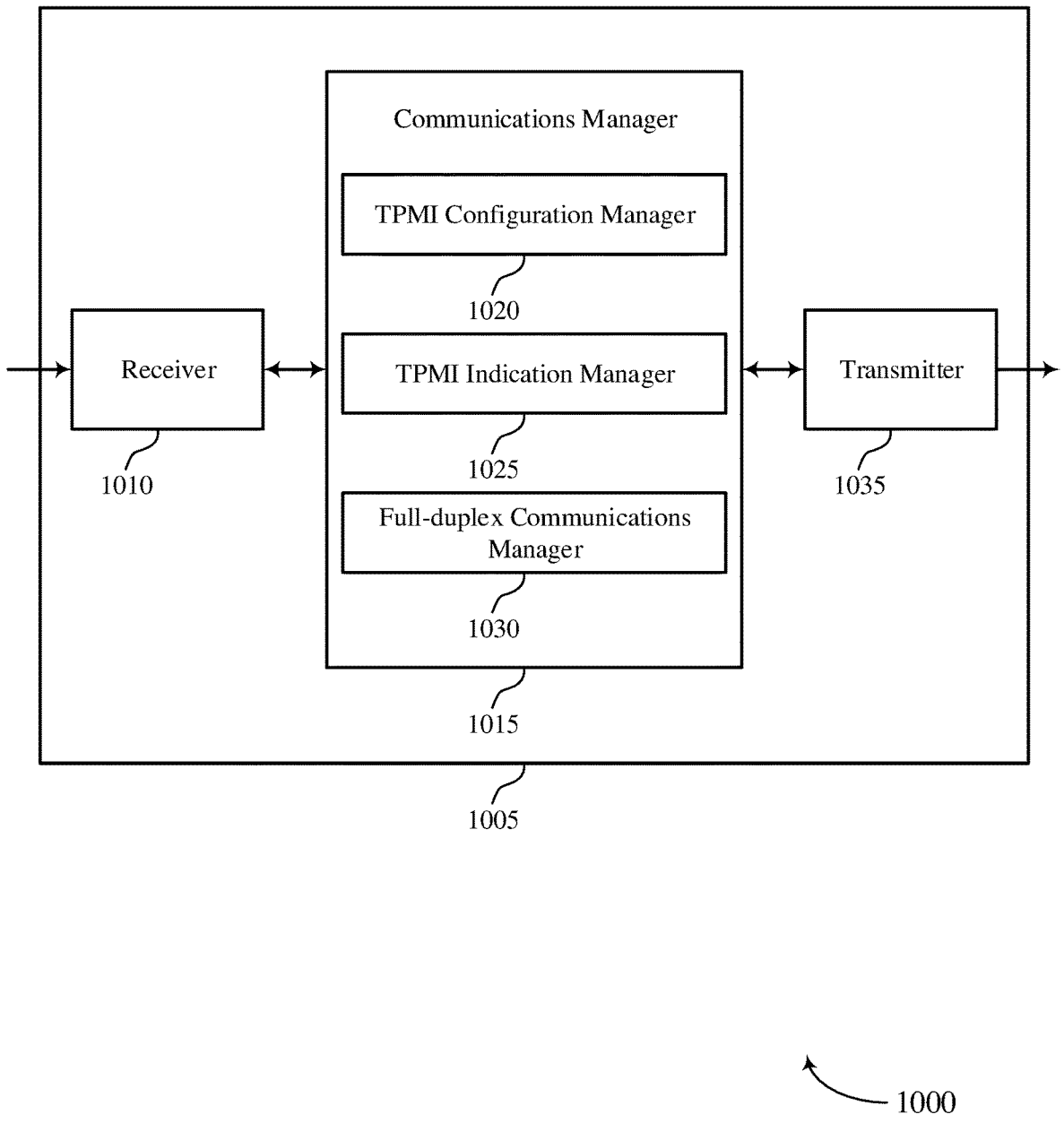

FIG. 10 shows a block diagram 1000 of a device 1005 that supports determining transmit precoding matrix indicators based on device feedback in accordance with aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (for example, via one or more buses).

The receiver 1010 may receive information such as packets, user data, or control information associated with various information channels (for example, control channels, data channels, and information related to determining TPMIs based on device feedback, among other examples). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a TPMI configuration manager 1020, a TPMI indication manager 1025, and a full-duplex communications manager 1030. The communications manager 1015 may be an example of aspects of the communications manager 1210 described herein.

The TPMI configuration manager 1020 may transmit, to a first device, an association between a reference signal transmitted from a second device and a first set of TPMIs associated with transmissions by the second device.

The TPMI indication manager 1025 may receive, from the first device, an indication of a second set of TPMIs based on an interference metric corresponding to full-duplex communications associated with the first device and the second device.

The full-duplex communications manager 1030 may determine a TPMI for full-duplex transmissions by the second device based on receiving the indication and transmit an indication of the determined TPMI to the second device.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
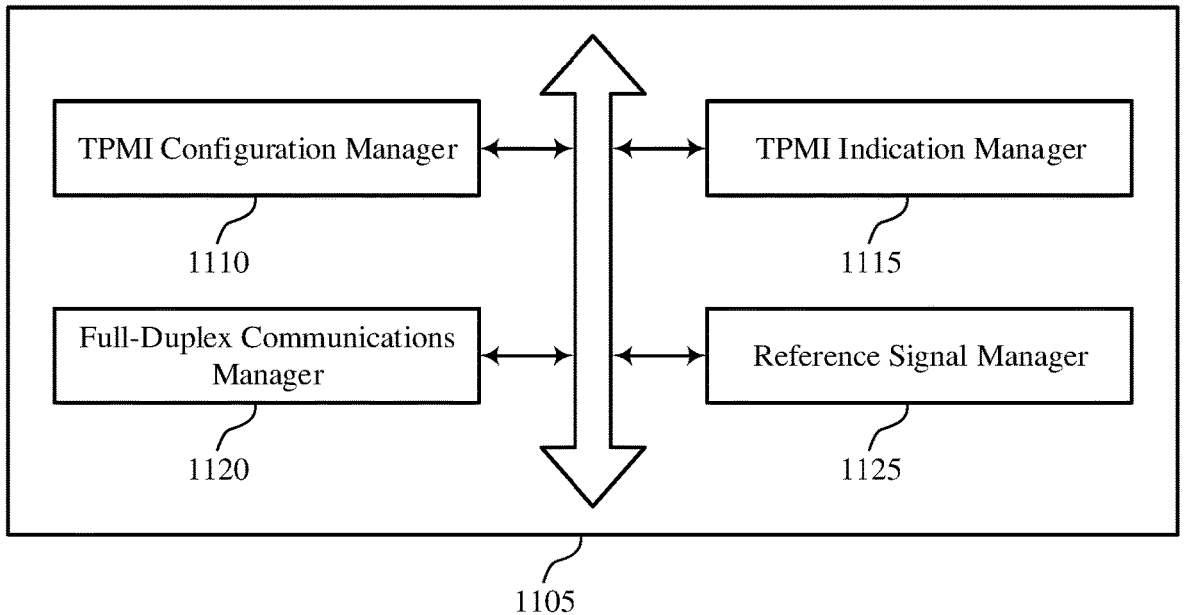
FIG. 11 shows a block diagram of a communications manager that supports determining transmit precoding matrix indicators based on device feedback in accordance with aspects of the present disclosure.

FIG. 11 shows a block diagram 1100 of a communications manager 1105 that supports determining transmit precoding matrix indicators based on device feedback in accordance with aspects of the present disclosure. The communications manager 1105 may be an example of aspects of a communications manager 915, a communications manager 1015, or a communications manager 1210 described herein. The communications manager 1105 may include a TPMI configuration manager 1110, a TPMI indication manager 1115, a full-duplex communications manager 1120, and a reference signal manager 1125. Each of these modules may communicate, directly or indirectly, with one another (for example, via one or more buses).

The TPMI configuration manager 1110 may transmit, to a first device, an association between a reference signal transmitted from a second device and a first set of TPMIs associated with transmissions by the second device. In some examples, the TPMI configuration manager 1110 may determine a third set of TPMIs based on one or more channel characteristics associated with the second device, where the first set of TPMIs is determined based on the third set of TPMIs. In some examples, the TPMI configuration manager 1110 may transmit, to the first device, an indication of the third set of TPMIs.

In some examples, the TPMI configuration manager 1110 may assign an RNTI value to the first device and the one or more additional devices, where the DCI is addressed at the assigned RNTI value. In some examples, the TPMI configuration manager 1110 may transmit, to the first device, a configuration indicating periodic CSI reporting. In some examples, the TPMI configuration manager 1110 may transmit an aperiodic reporting trigger to the first device, in which the aperiodic reporting trigger includes a third set of TPMIs based on one or more channel characteristics associated with the second device. In some examples, the third set of TPMIs is transmitted in MAC signaling or in DCI that is specific to the first device. In some examples, the third set of TPMIs is transmitted in DCI that is common to the first device and one or more additional devices.

In some examples, the indication of the third set of TPMIs includes a codepoint or a bitmap. In some examples, the codepoint indicates an index of a set of TPMIs in a list of sets of TPMIs. In some examples, a size of the list of sets of TPMIs is equal to a combinatorial number based on selecting the third set of TPMIs from a full set of TPMIs. In some examples, a bin of the bitmap indicates whether a TPMI of a full set of TPMIs is included in the third set of TPMIs, and where a mapping between the bin and the TPMI of the full set of TPMIs is based on the position of the bin.

The TPMI indication manager 1115 may receive, from the first device, an indication of a second set of TPMIs based on an interference metric corresponding to full-duplex communications associated with the first device and the second device. In some examples, the TPMI indication manager 1115 may receive the indication of the second set of TPMIs periodically based on the configuration indicating periodic CSI reporting. In some examples, the TPMI indication manager 1115 may receive the indication of the second set of TPMIs based on the aperiodic reporting trigger.

In some examples, the second set of TPMIs includes TPMIs associated with SINRs that exceed a threshold. In some examples, the second set of TPMIs includes a configured number of TPMIs associated with highest SINRs of calculated SINRs. In some examples, the second set of TPMIs includes TPMIs associated with SINRs that fall below a threshold. In some examples, the second set of TPMIs includes a configured number of TPMIs associated with lowest SINRs of calculated SINRs.

In some examples, the indication of the second set of TPMIs includes a CSI report. In some examples, the CSI report further includes one or more of an RI, a PMI, or a CQI based on the determined interference metric. In some examples, one or more TPMIs in the second set of TPMIs are associated with one or more of the RI, the PMI, or the CQI.

In some examples, the indication of the second set of TPMIs includes a codepoint or a bitmap. In some examples, the codepoint indicates an index of a set of TPMIs in a list of sets of TPMIs. In some examples, a size of the list of sets of TPMIs is equal to a combinatorial number based on selecting the second set of TPMIs from the first set of TPMIs. In some examples, a bin of the bitmap indicates whether a TPMI of the first set of TPMIs is included in the second set of TPMIs, and where a mapping between the bin and the TPMI of the first set of TPMIs is based on the position of the bin.

In some examples, the second set of TPMIs is a subset of the first set of TPMIs. In some examples, a TPMI in the second set of TPMIs is associated with an indication of the reference signal transmitted from the second device.

The full-duplex communications manager 1120 may determine a TPMI for full-duplex transmissions by the second device based on receiving the indication. The full-duplex communications manager 1120 may transmit an indication of the determined TPMI to the second device. In some examples, the full-duplex communications manager 1120 may determine a pairing of the first device and the second device based on one or more of the second set of TPMIs, one or more channel characteristics associated with the first device, or one or more channel characteristics associated with the second device.

In some examples, the full-duplex communications manager 1120 may transmit a first data transmission to the first device. In some examples, the full-duplex communications manager 1120 may receive a second data transmission from the second device, in which the second data transmission is a full-duplex communication with the first transmission based on the determined pairing. In some examples, the one or more channel characteristics associated with the first device include a first SINR. In some examples, the one or more channel characteristics associated with the second device include a second SINR.

The reference signal manager 1125 may transmit, to the first device, an association between the reference signal and the third set of TPMIs. In some examples, the reference signal manager 1125 may transmit a CSI-RS to the first device, where the second set of TPMIs is further based on a signal matrix associated with the CSI-RS. In some examples, the association between the reference signal and the third set of TPMIs includes an explicit mapping. In some examples, the association between the reference signal and the third set of TPMIs includes an implicit mapping based on an ordering of the third set of TPMIs in a list of a set of subsets of TPMIs.

In some examples, the association between the reference signal transmitted from the second device and the first set of TPMIs includes an indication of physical resources associated with transmission of the reference signal. In some examples, the reference signal is an SRS.

Figure 12:
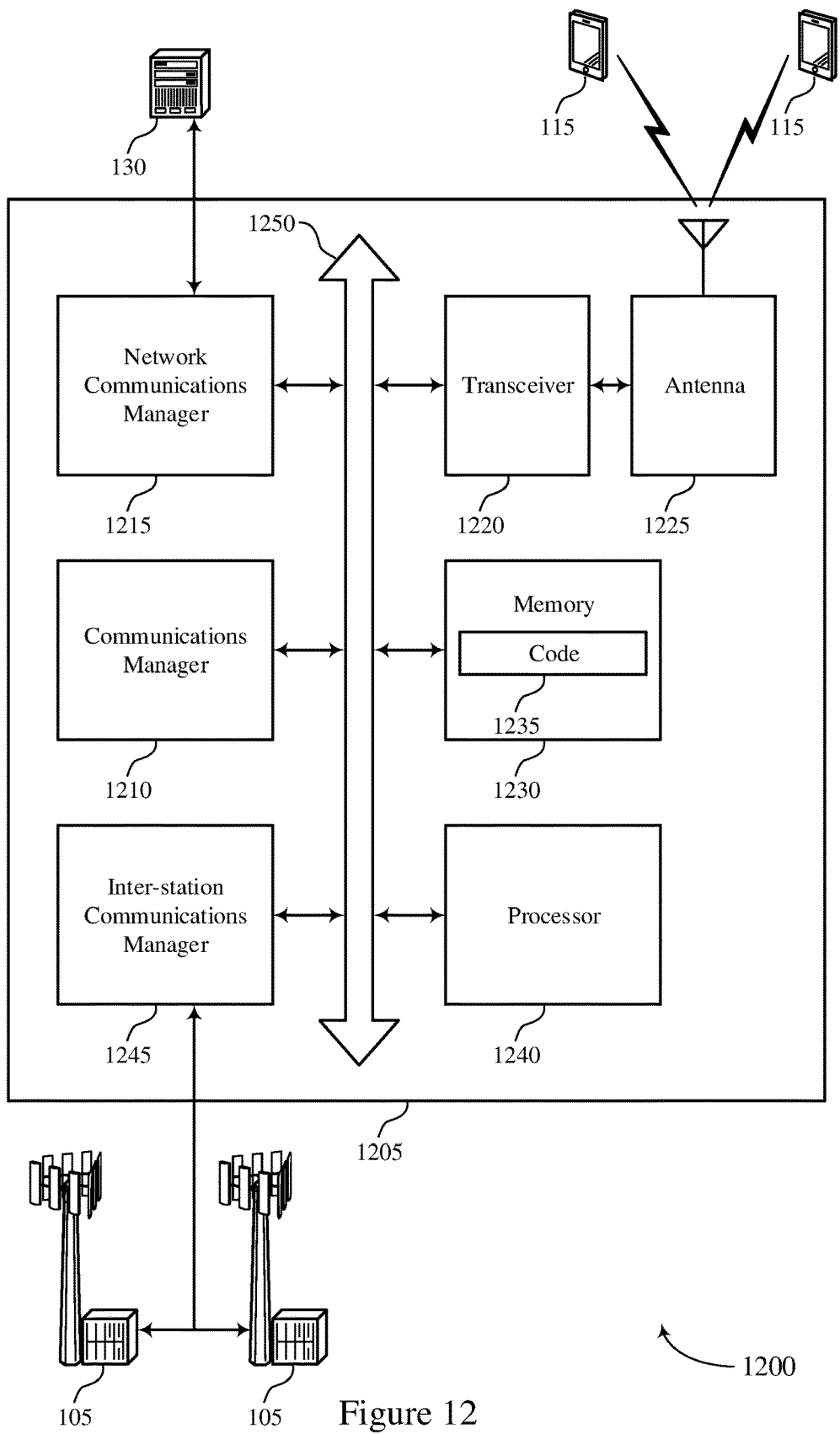
FIG. 12 shows a diagram of a system including a device that supports determining transmit precoding matrix indicators based on device feedback in accordance with aspects of the present disclosure.

FIG. 12 shows a diagram of a system 1200 including a device 1205 that supports determining transmit precoding matrix indicators based on device feedback in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (for example, bus 1250).

The communications manager 1210 may transmit, to a first device, an association between a reference signal transmitted from a second device and a first set of TPMIs associated with transmissions by the second device, receive, from the first device, an indication of a second set of TPMIs based on an interference metric corresponding to full-duplex communications associated with the first device and the second device, determine a TPMI for full-duplex transmissions by the second device based on receiving the indication, and transmit an indication of the determined TPMI to the second device.

The network communications manager 1215 may manage communications with the core network (for example, via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some examples, the wireless device may include a single antenna 1225. However, in some examples the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (for example, the processor 1240) cause the device to perform various functions described herein. In some examples, the memory 1230 may contain, among other things, a BIOS which may control basic hardware or software operation such as the interaction with peripheral components or devices.

The processor 1240 may include an intelligent hardware device (for example, a general-purpose processor, a DSP, a CPU, a microcontroller, an ASIC, an FPGA, a programmable logic device, a discrete gate or transistor logic component, a discrete hardware component, or any combination thereof). In some examples, the processor 1240 may be configured to operate a memory array using a memory controller. In some examples, a memory controller may be integrated into processor 1240. The processor 1240 may be configured to execute computer-readable instructions stored in a memory (for example, the memory 1230) to cause the device 1205 to perform various functions (for example, functions or tasks supporting determining TPMIs based on device feedback).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some examples, the code 1235 may not be directly executable by the processor 1240 but may cause a computer (for example, when compiled and executed) to perform functions described herein.

Figure 13:
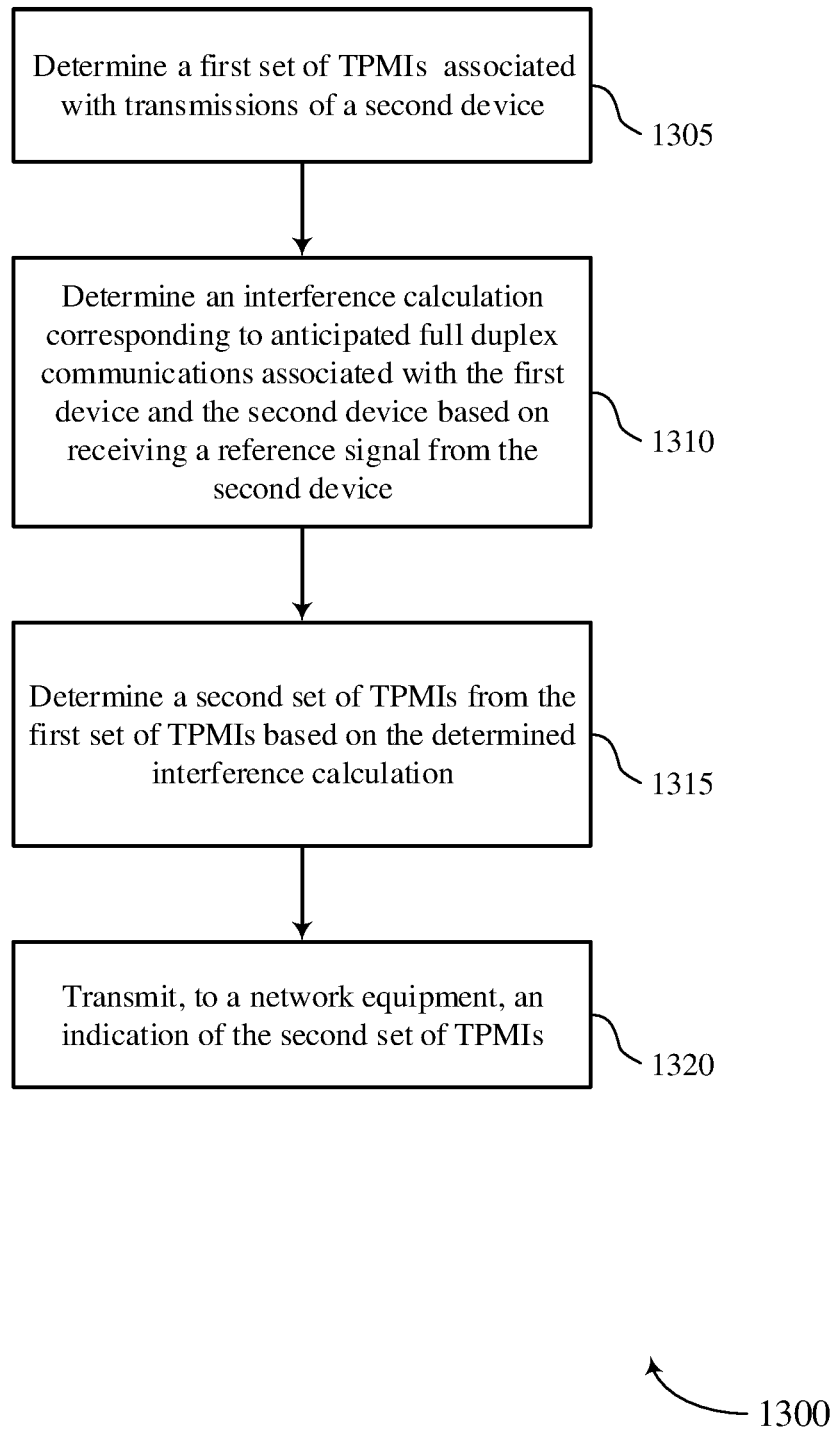
FIGS. 13 through 20 show flowcharts illustrating methods that support determining transmit precoding matrix indicators based on device feedback in accordance with aspects of the present disclosure.

FIG. 13 shows a flowchart illustrating a method 1300 that supports determining transmit precoding matrix indicators based on device feedback in accordance with aspects of the present disclosure. In some examples, the operations of method 1300 may be implemented by a first device (for example, a UE 115) or its components as described herein. For example, the operations of method 1300 may be performed by a communications manager as described with reference to FIGS. 5 through 8. In some examples, a first device may execute a set of instructions to control the functional elements of the first device to perform the functions described below. Additionally or alternatively, a first device may perform aspects of the functions described below using special-purpose hardware.

At 1305, the first device may determine a first set of TPMIs associated with transmissions by a second device. The operations of 1305 may be performed according to the methods described herein. In some examples, aspects of the operations of 1305 may be performed by a TPMI candidate manager as described with reference to FIGS. 5 through 8.

At 1310, the first device may receive a reference signal from the second device and determine an interference metric corresponding to full-duplex communications associated with the first device and the second device based on receiving the reference signal. The operations of 1310 may be performed according to the methods described herein. In some examples, aspects of the operations of 1310 may be performed by an interference component as described with reference to FIGS. 5 through 8.

At 1315, the first device may determine a second set of TPMIs from the first set of TPMIs based on the determined interference metric. The operations of 1315 may be performed according to the methods described herein. In some examples, aspects of the operations of 1315 may be performed by a TPMI selection manager as described with reference to FIGS. 5 through 8.

At 1320, the first device may transmit, to a network equipment, an indication of the second set of TPMIs. The operations of 1320 may be performed according to the methods described herein. In some examples, aspects of the operations of 1320 may be performed by a TPMI reporting manager as described with reference to FIGS. 5 through 8.

Figure 14:
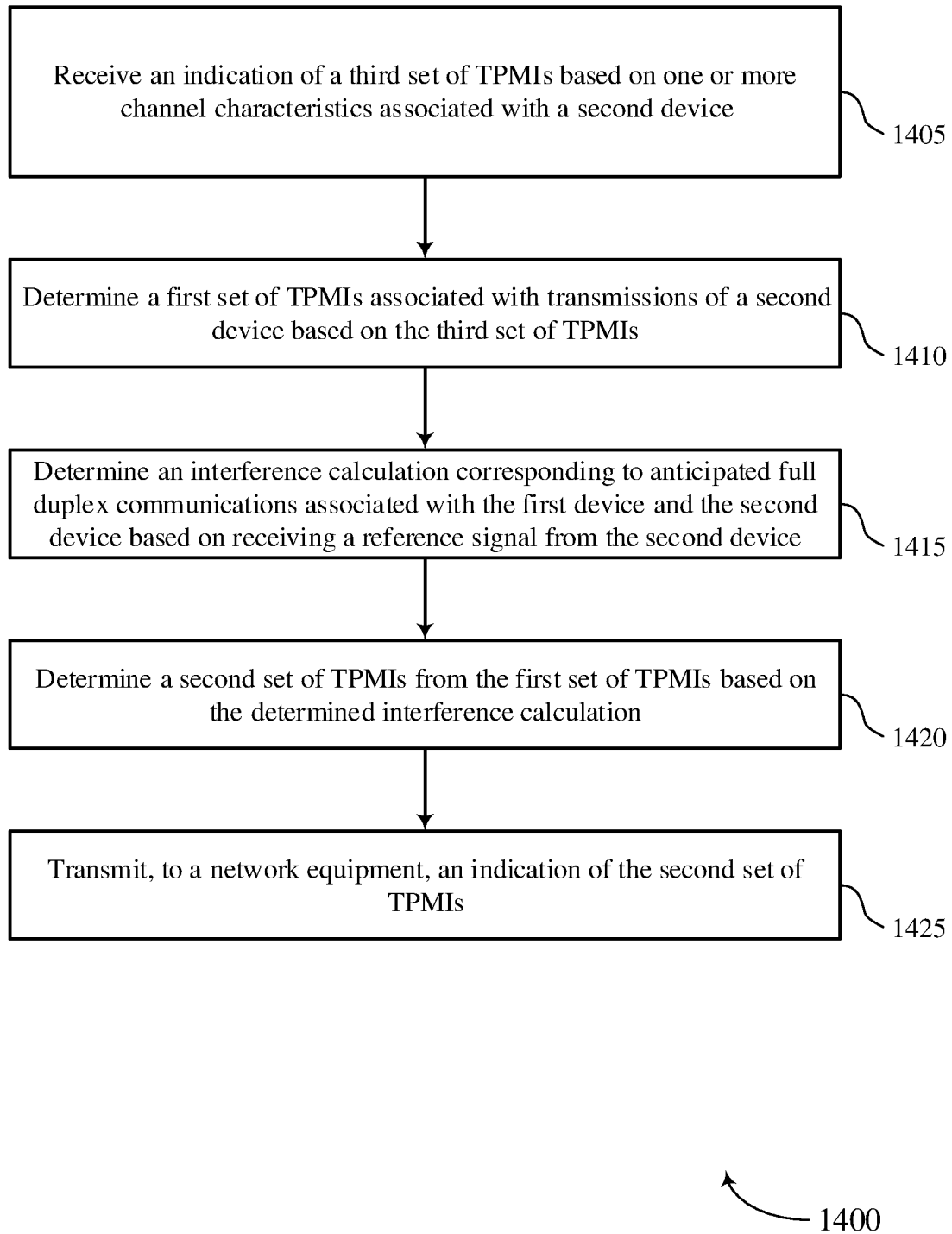

FIG. 14 shows a flowchart illustrating a method 1400 that supports determining transmit precoding matrix indicators based on device feedback in accordance with aspects of the present disclosure. In some examples, the operations of method 1400 may be implemented by a first device (for example, a UE 115) or its components as described herein.

For example, the operations of method 1400 may be performed by a communications manager as described with reference to FIGS. 5 through 8. In some examples, a first device may execute a set of instructions to control the functional elements of the first device to perform the functions described below. Additionally or alternatively, a first device may perform aspects of the functions described below using special-purpose hardware.

At 1405, the first device may receive an indication of a third set of TPMIs based on one or more channel characteristics associated with a second device. The operations of 1405 may be performed according to the methods described herein. In some examples, aspects of the operations of 1405 may be performed by a TPMI candidate manager as described with reference to FIGS. 5 through 8.

At 1410, the first device may determine a first set of TPMIs associated with transmissions by a second device based on receiving the indication of the third set of TPMIs. The operations of 1410 may be performed according to the methods described herein. In some examples, aspects of the operations of 1410 may be performed by a TPMI candidate manager as described with reference to FIGS. 5 through 8.

At 1415, the first device may receive a reference signal from the second device and determine an interference metric corresponding to full-duplex communications associated with the first device and the second device based on receiving the reference signal. The operations of 1415 may be performed according to the methods described herein. In some examples, aspects of the operations of 1415 may be performed by an interference component as described with reference to FIGS. 5 through 8.

At 1420, the first device may determine a second set of TPMIs from the first set of TPMIs based on the determined interference metric. The operations of 1420 may be performed according to the methods described herein. In some examples, aspects of the operations of 1420 may be performed by a TPMI selection manager as described with reference to FIGS. 5 through 8.

At 1425, the first device may transmit, to a network equipment, an indication of the second set of TPMIs. The operations of 1425 may be performed according to the methods described herein. In some examples, aspects of the operations of 1425 may be performed by a TPMI reporting manager as described with reference to FIGS. 5 through 8.

Figure 15:
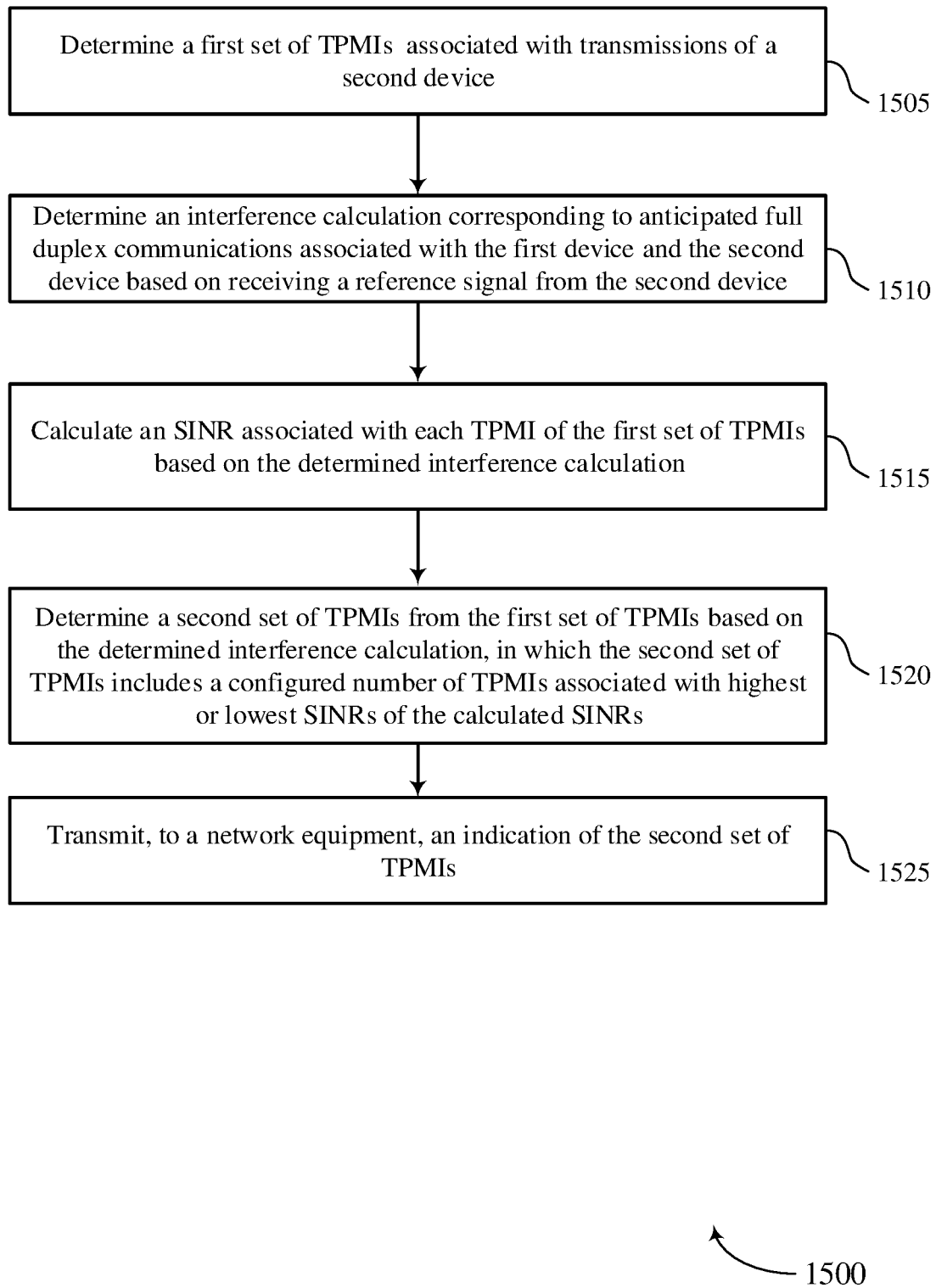

FIG. 15 shows a flowchart illustrating a method 1500 that supports determining transmit precoding matrix indicators based on device feedback in accordance with aspects of the present disclosure. In some examples, the operations of method 1500 may be implemented by a first device (for example, a UE 115) or its components as described herein. For example, the operations of method 1500 may be performed by a communications manager as described with reference to FIGS. 5 through 8. In some examples, a first device may execute a set of instructions to control the functional elements of the first device to perform the functions described below. Additionally or alternatively, a first device may perform aspects of the functions described below using special-purpose hardware.

At 1505, the first device may determine a first set of TPMIs associated with transmissions by a second device. The operations of 1505 may be performed according to the methods described herein. In some examples, aspects of the operations of 1505 may be performed by a TPMI candidate manager as described with reference to FIGS. 5 through 8.

At 1510, the first device may receive a reference signal from the second device and determine an interference metric corresponding to full-duplex communications associated with the first device and the second device based on receiving the reference signal. The operations of 1510 may be performed according to the methods described herein. In some examples, aspects of the operations of 1510 may be performed by an interference component as described with reference to FIGS. 5 through 8.

At 1515, the first device may calculate an SINR associated with each TPMI of the first set of TPMIs based on the determined interference metric. The operations of 1515 may be performed according to the methods described herein. In some examples, aspects of the operations of 1515 may be performed by an interference component as described with reference to FIGS. 5 through 8.

At 1520, the first device may determine a second set of TPMIs from the first set of TPMIs based on the determined interference metric, in which the second set of TPMIs includes a configured number of TPMIs associated with highest or lowest SINRs of the calculated SINRs. The operations of 1520 may be performed according to the methods described herein. In some examples, aspects of the operations of 1520 may be performed by a TPMI selection manager as described with reference to FIGS. 5 through 8.

At 1525, the first device may transmit, to a network equipment, an indication of the second set of TPMIs. The operations of 1525 may be performed according to the methods described herein. In some examples, aspects of the operations of 1525 may be performed by a TPMI reporting manager as described with reference to FIGS. 5 through 8.

Figure 16:
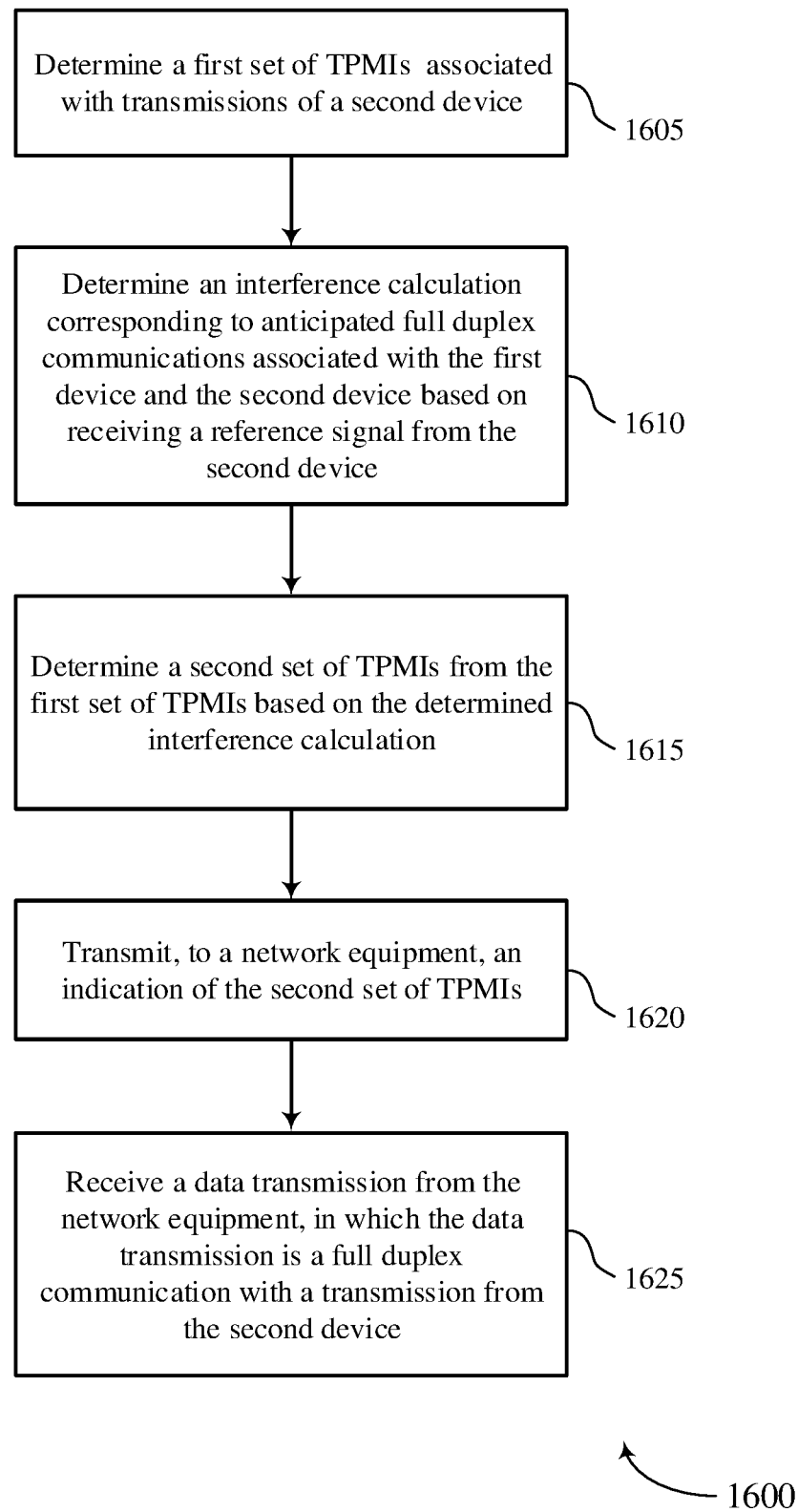

FIG. 16 shows a flowchart illustrating a method 1600 that supports determining transmit precoding matrix indicators based on device feedback in accordance with aspects of the present disclosure. In some examples, the operations of method 1600 may be implemented by a first device (for example, a UE 115) or its components as described herein. For example, the operations of method 1600 may be performed by a communications manager as described with reference to FIGS. 5 through 8. In some examples, a first device may execute a set of instructions to control the functional elements of the first device to perform the functions described below. Additionally or alternatively, a first device may perform aspects of the functions described below using special-purpose hardware.

At 1605, the first device may determine a first set of TPMIs associated with transmissions by a second device. The operations of 1605 may be performed according to the methods described herein. In some examples, aspects of the operations of 1605 may be performed by a TPMI candidate manager as described with reference to FIGS. 5 through 8.

At 1610, the first device may receive a reference signal from the second device and determine an interference metric corresponding to full-duplex communications associated with the first device and the second device based on receiving the reference signal. The operations of 1610 may be performed according to the methods described herein. In some examples, aspects of the operations of 1610 may be performed by an interference component as described with reference to FIGS. 5 through 8.

At 1615, the first device may determine a second set of TPMIs from the first set of TPMIs based on the determined interference metric. The operations of 1615 may be performed according to the methods described herein. In some examples, aspects of the operations of 1615 may be performed by a TPMI selection manager as described with reference to FIGS. 5 through 8.

At 1620, the first device may transmit, to a network equipment, an indication of the second set of TPMIs. The operations of 1620 may be performed according to the methods described herein. In some examples, aspects of the operations of 1620 may be performed by a TPMI reporting manager as described with reference to FIGS. 5 through 8.

At 1625, the first device may receive a data transmission from the network equipment, in which the data transmission is a full-duplex communication with a transmission from the second device. The operations of 1625 may be performed according to the methods described herein. In some examples, aspects of the operations of 1625 may be performed by a DL transmission manager as described with reference to FIGS. 5 through 8.

Figure 17:
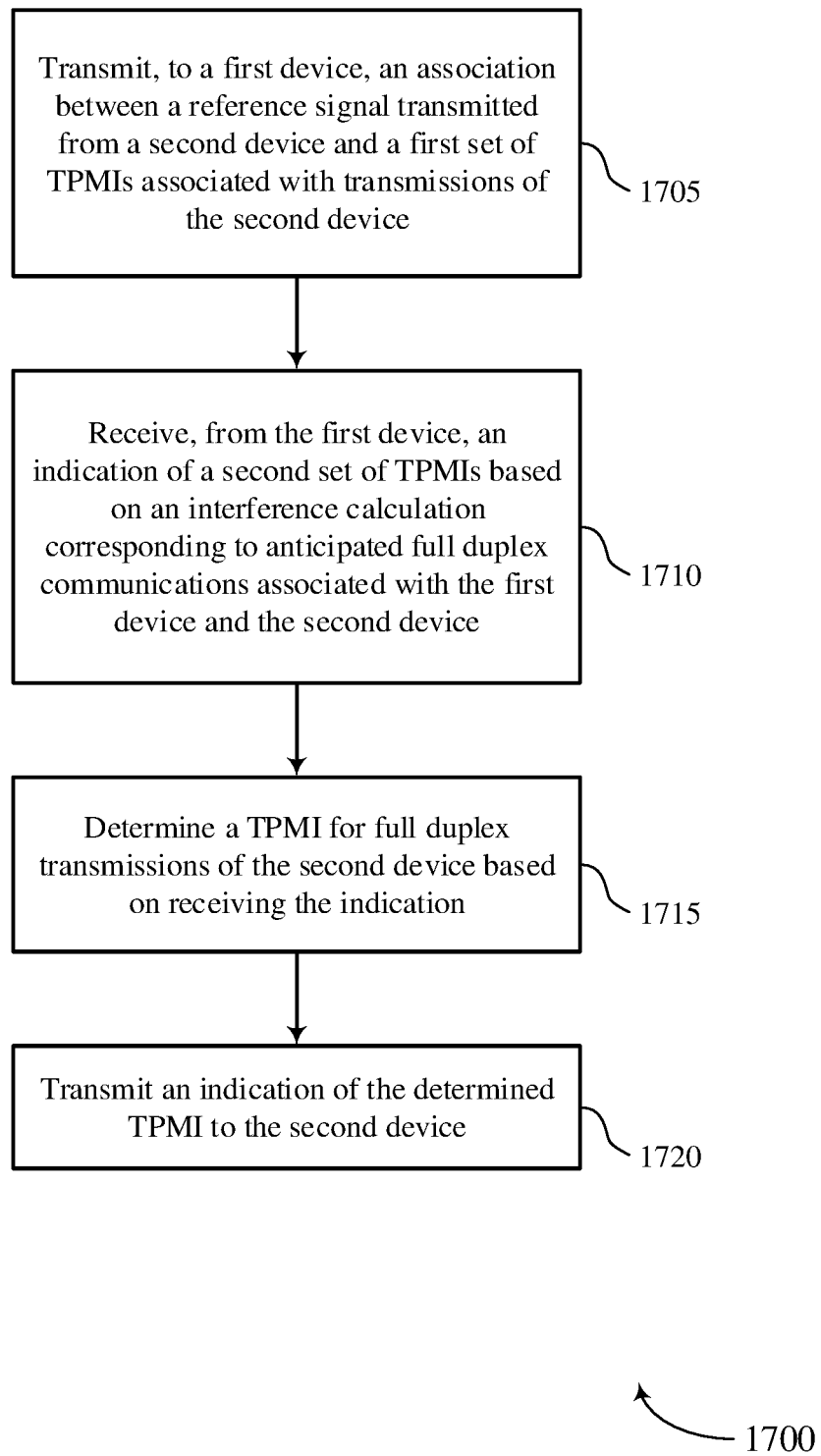

FIG. 17 shows a flowchart illustrating a method 1700 that supports determining transmit precoding matrix indicators based on device feedback in accordance with aspects of the present disclosure. The operations of method 1700 may be implemented by a network equipment (for example, a base station 105) or its components as described herein. For example, the operations of method 1700 may be performed by a communications manager as described with reference to FIGS. 9 through 12. In some examples, a network equipment may execute a set of instructions to control the functional elements of the network equipment to perform the functions described below. Additionally or alternatively, a network equipment may perform aspects of the functions described below using special-purpose hardware.

At 1705, the network equipment may transmit, to a first device, an association between a reference signal transmitted from a second device and a first set of TPMIs associated with transmissions by the second device. The operations of 1705 may be performed according to the methods described herein. In some examples, aspects of the operations of 1705 may be performed by a TPMI configuration manager as described with reference to FIGS. 9 through 12.

At 1710, the network equipment may receive, from the first device, an indication of a second set of TPMIs based on an interference metric corresponding to full-duplex communications associated with the first device and the second device. The operations of 1710 may be performed according to the methods described herein. In some examples, aspects of the operations of 1710 may be performed by a TPMI indication manager as described with reference to FIGS. 9 through 12.

At 1715, the network equipment may determine a TPMI for full-duplex transmissions by the second device based on receiving the indication. The operations of 1715 may be performed according to the methods described herein. In some examples, aspects of the operations of 1715 may be performed by a full-duplex communications manager as described with reference to FIGS. 9 through 12.

At 1720, the network equipment may transmit an indication of the determined TPMI to the second device. The operations of 1720 may be performed according to the methods described herein. In some examples, aspects of the operations of 1720 may be performed by a full-duplex communications manager as described with reference to FIGS. 9 through 12.

Figure 18:
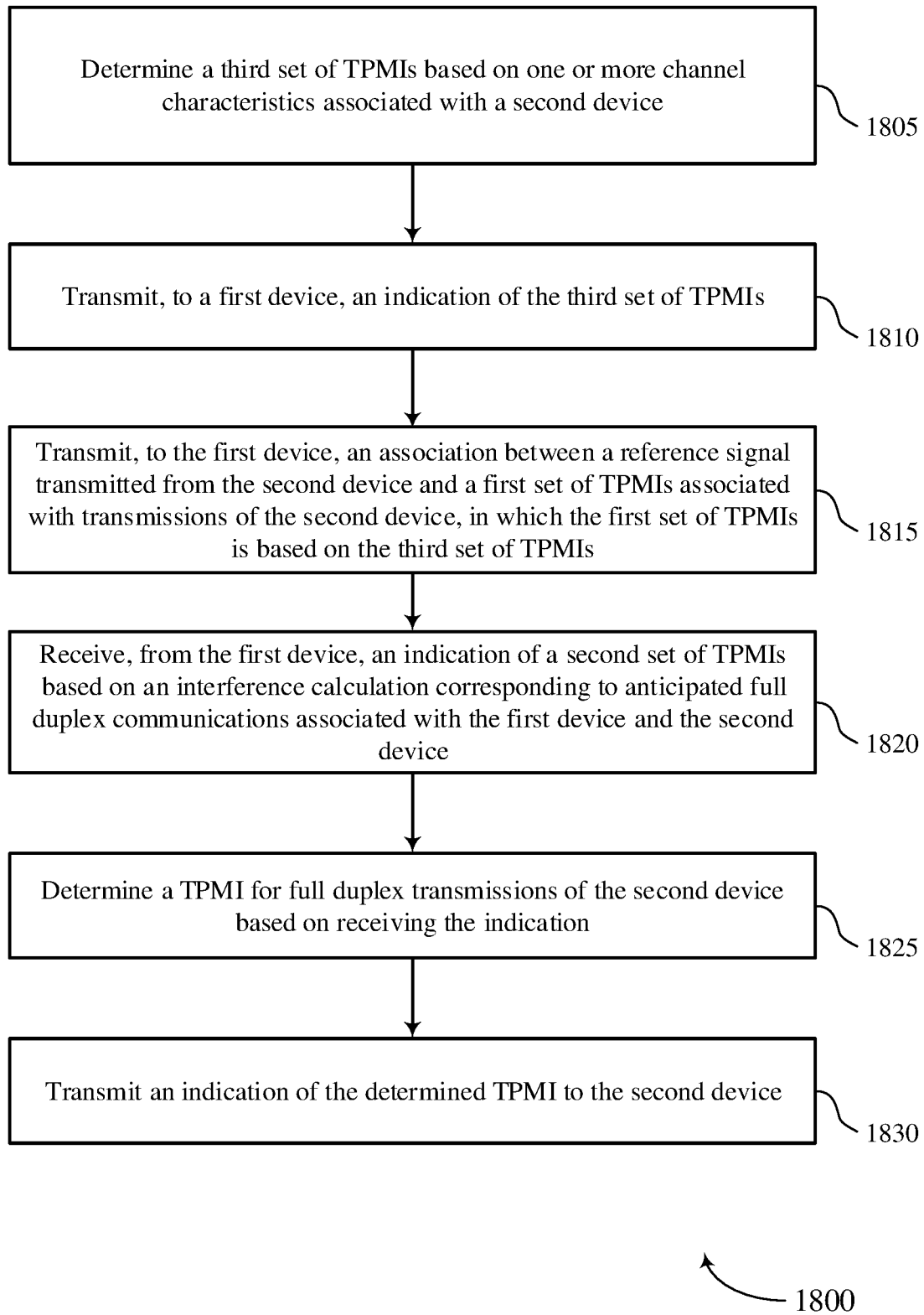

FIG. 18 shows a flowchart illustrating a method 1800 that supports determining transmit precoding matrix indicators based on device feedback in accordance with aspects of the present disclosure. The operations of method 1800 may be implemented by a network equipment (for example, a base station 105) or its components as described herein. For example, the operations of method 1800 may be performed by a communications manager as described with reference to FIGS. 9 through 12. In some examples, a network equipment may execute a set of instructions to control the functional elements of the network equipment to perform the functions described below. Additionally or alternatively, a network equipment may perform aspects of the functions described below using special-purpose hardware.

At 1805, the network equipment may determine a third set of TPMIs based on one or more channel characteristics associated with a second device. The operations of 1805 may be performed according to the methods described herein. In some examples, aspects of the operations of 1805 may be performed by a TPMI configuration manager as described with reference to FIGS. 9 through 12.

At 1810, the network equipment may transmit, to a first device, an indication of the third set of TPMIs. The operations of 1810 may be performed according to the methods described herein. In some examples, aspects of the operations of 1810 may be performed by a TPMI configuration manager as described with reference to FIGS. 9 through 12.

At 1815, the network equipment may transmit, to the first device, an association between a reference signal transmitted from the second device and a first set of TPMIs associated with transmissions by the second device, in which the first set of TPMIs is determined based on the third set of TPMIs. The operations of 1815 may be performed according to the methods described herein. In some examples, aspects of the operations of 1815 may be performed by a TPMI configuration manager as described with reference to FIGS. 9 through 12.

At 1820, the network equipment may receive, from the first device, an indication of a second set of TPMIs based on an interference metric corresponding to full-duplex communications associated with the first device and the second device. The operations of 1820 may be performed according to the methods described herein. In some examples, aspects of the operations of 1820 may be performed by a TPMI indication manager as described with reference to FIGS. 9 through 12.

At 1825, the network equipment may determine a TPMI for full-duplex transmissions by the second device based on receiving the indication. The operations of 1825 may be performed according to the methods described herein. In some examples, aspects of the operations of 1825 may be performed by a full-duplex communications manager as described with reference to FIGS. 9 through 12.

At 1830, the network equipment may transmit an indication of the determined TPMI to the second device. The operations of 1830 may be performed according to the methods described herein. In some examples, aspects of the operations of 1830 may be performed by a full-duplex communications manager as described with reference to FIGS. 9 through 12.

Figure 19:
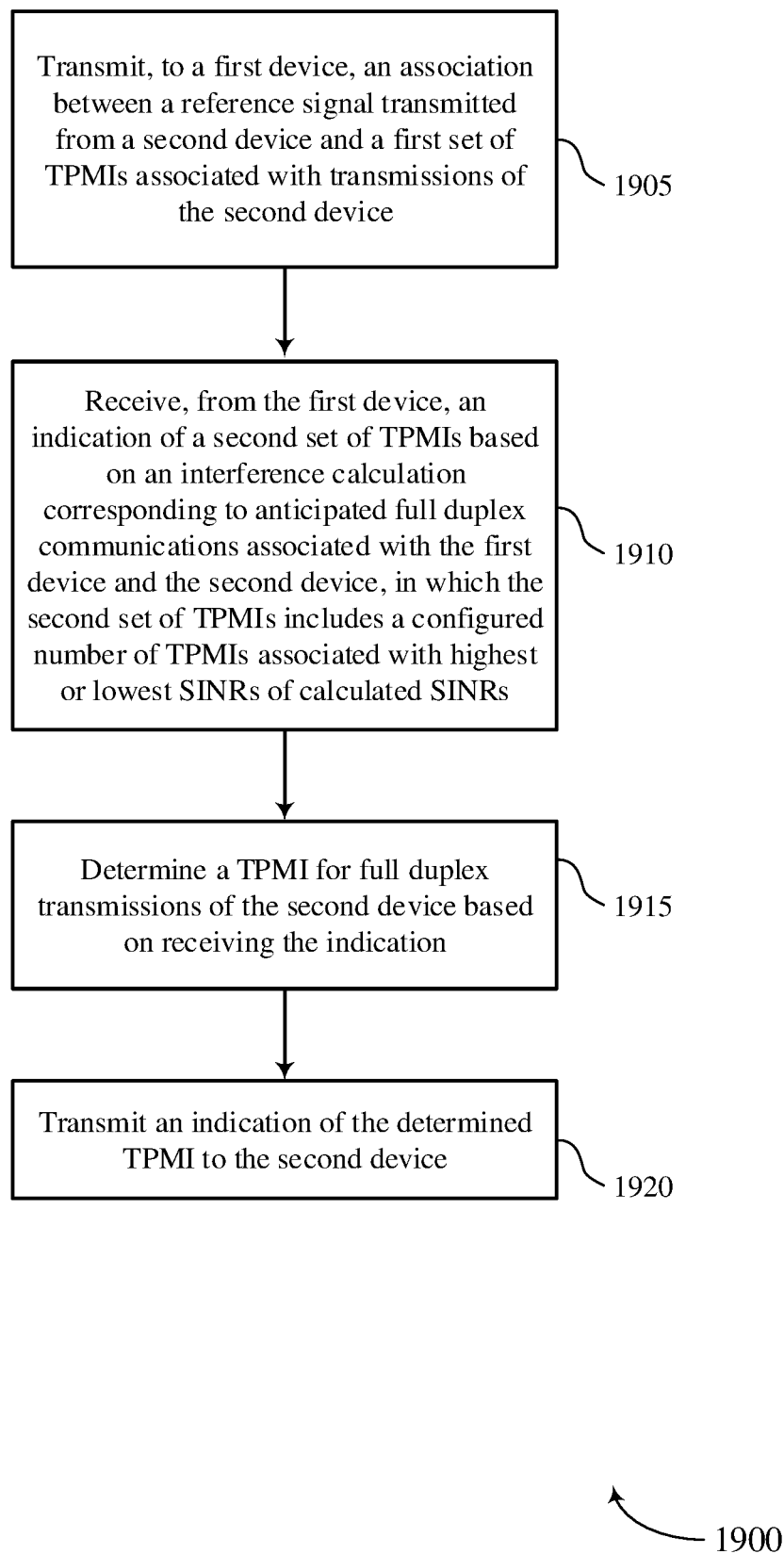

FIG. 19 shows a flowchart illustrating a method 1900 that supports determining transmit precoding matrix indicators based on device feedback in accordance with aspects of the present disclosure. The operations of method 1900 may be implemented by a network equipment (for example, a base station 105) or its components as described herein. For example, the operations of method 1900 may be performed by a communications manager as described with reference to FIGS. 9 through 12. In some examples, a network equipment may execute a set of instructions to control the functional elements of the network equipment to perform the functions described below. Additionally or alternatively, a network equipment may perform aspects of the functions described below using special-purpose hardware.

At 1905, the network equipment may transmit, to a first device, an association between a reference signal transmitted from a second device and a first set of TPMIs associated with transmissions by the second device. The operations of 1905 may be performed according to the methods described herein. In some examples, aspects of the operations of 1905 may be performed by a TPMI configuration manager as described with reference to FIGS. 9 through 12.

At 1910, the network equipment may receive, from the first device, an indication of a second set of TPMIs based on an interference metric corresponding to full-duplex communications associated with the first device and the second device, in which the second set of TPMIs includes a configured number of TPMIs associated with highest or lowest SINRs of calculated SINRs. The operations of 1910 may be performed according to the methods described herein. In some examples, aspects of the operations of 1910 may be performed by a TPMI indication manager as described with reference to FIGS. 9 through 12.

At 1915, the network equipment may determine a TPMI for full-duplex transmissions by the second device based on receiving the indication. The operations of 1915 may be performed according to the methods described herein. In some examples, aspects of the operations of 1915 may be performed by a full-duplex communications manager as described with reference to FIGS. 9 through 12.

At 1920, the network equipment may transmit an indication of the determined TPMI to the second device. The operations of 1920 may be performed according to the methods described herein. In some examples, aspects of the operations of 1920 may be performed by a full-duplex communications manager as described with reference to FIGS. 9 through 12.

Figure 20:
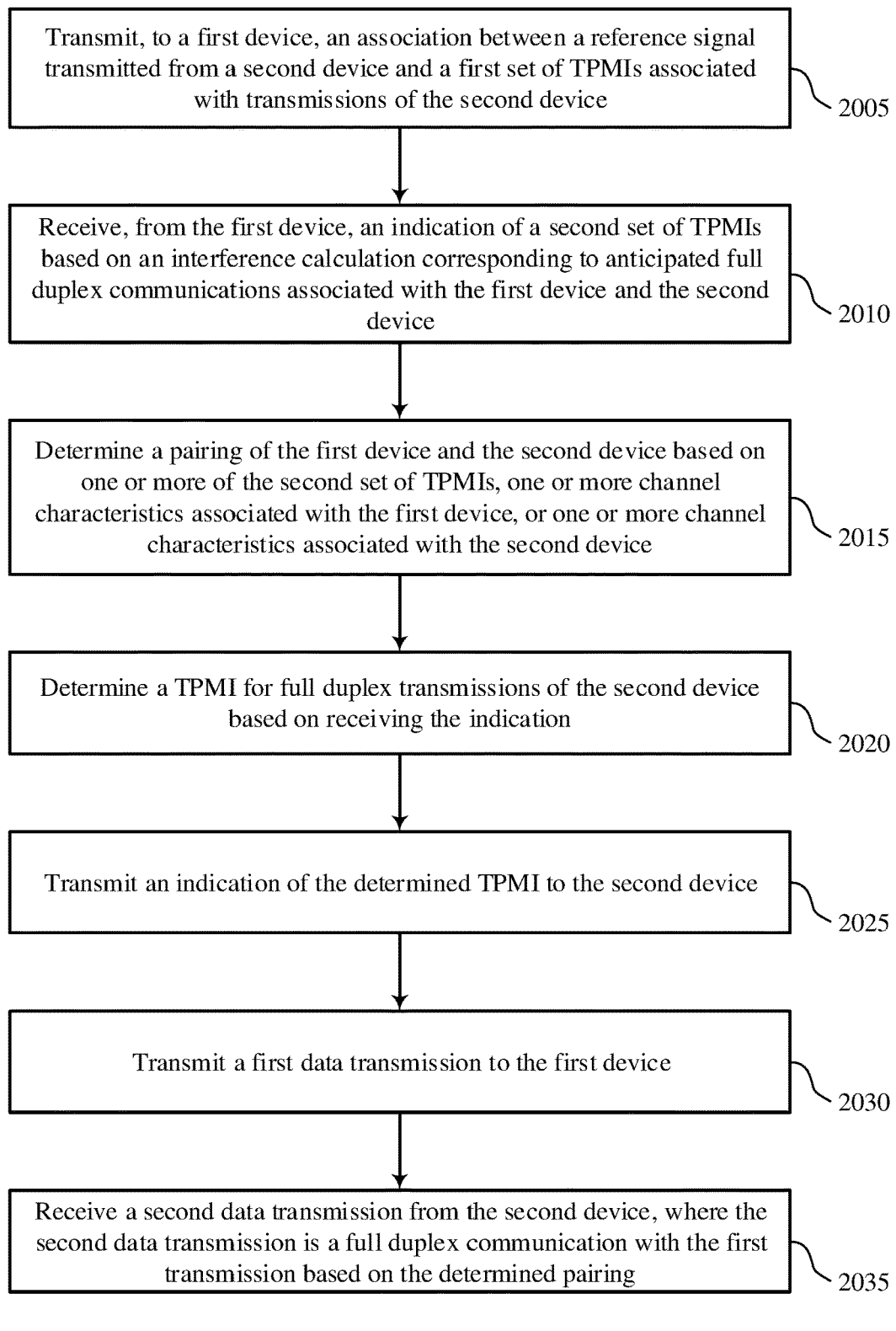

FIG. 20 shows a flowchart illustrating a method 2000 that supports determining transmit precoding matrix indicators based on device feedback in accordance with aspects of the present disclosure. The operations of method 2000 may be implemented by a network equipment (for example, a base station 105) or its components as described herein. For example, the operations of method 2000 may be performed by a communications manager as described with reference to FIGS. 9 through 12. In some examples, a network equipment may execute a set of instructions to control the functional elements of the network equipment to perform the functions described below. Additionally or alternatively, a network equipment may perform aspects of the functions described below using special-purpose hardware.

At 2005, the network equipment may transmit, to a first device, an association between a reference signal transmitted from a second device and a first set of TPMIs associated with transmissions by the second device. The operations of 2005 may be performed according to the methods described herein. In some examples, aspects of the operations of 2005 may be performed by a TPMI configuration manager as described with reference to FIGS. 9 through 12.

At 2010, the network equipment may receive, from the first device, an indication of a second set of TPMIs based on an interference metric corresponding to full-duplex communications associated with the first device and the second device. The operations of 2010 may be performed according to the methods described herein. In some examples, aspects of the operations of 2010 may be performed by a TPMI indication manager as described with reference to FIGS. 9 through 12.

At 2015, the network equipment may determine a pairing of the first device and the second device based on one or more of the second set of TPMIs, one or more channel characteristics associated with the first device, or one or more channel characteristics associated with the second device. The operations of 2015 may be performed according to the methods described herein. In some examples, aspects of the operations of 2015 may be performed by a full-duplex communications manager as described with reference to FIGS. 9 through 12.

At 2020, the network equipment may determine a TPMI for full-duplex transmissions by the second device based on receiving the indication. The operations of 2020 may be performed according to the methods described herein. In some examples, aspects of the operations of 2020 may be performed by a full-duplex communications manager as described with reference to FIGS. 9 through 12.

At 2025, the network equipment may transmit an indication of the determined TPMI to the second device. The operations of 2025 may be performed according to the methods described herein. In some examples, aspects of the operations of 2025 may be performed by a full-duplex communications manager as described with reference to FIGS. 9 through 12.

At 2030, the network equipment may transmit a first data transmission to the first device. The operations of 2030 may be performed according to the methods described herein. In some examples, aspects of the operations of 2030 may be performed by a full-duplex communications manager as described with reference to FIGS. 9 through 12.

At 2035, the network equipment may receive a second data transmission from the second device, where the second data transmission is a full-duplex communication with the first transmission based on the determined pairing. The operations of 2035 may be performed according to the methods described herein. In some examples, aspects of the operations of 2035 may be performed by a full-duplex communications manager as described with reference to FIGS. 9 through 12.

Various aspects generally relate to full-duplex communications, and more specifically to reducing interference at a base station between DL transmissions to a first device and UL transmissions from a second device by determining a TPMI for the UL transmissions. The first device may determine a candidate subset of possible TPMIs the second device may use for UL transmissions in full-duplex communications. The first device may measure a reference signal transmitted from the second device to determine a preferable or unpreferable subset of TPMIs from the candidate subset based on an interference metric. The first device may indicate the preferable or unpreferable subset to the base station. Based on the subset indicated by the first device, the base station may determine a pairing of the first device and the second device for full-duplex communications. Additionally, the base station may determine a TPMI for the second device to use in UL transmissions based on the subset indicated by the first device.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), among other examples. CDMA2000 covers IS-2000, IS-95, and IS-856 standards. IS-2000 Releases may be commonly referred to as CDMA2000 1x, 1x, among other examples. IS-856 (TIA-856) is commonly referred to as CDMA2000 1xEV-DO, High Rate Packet Data (HRPD), among other examples. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, among other examples. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the 3GPP. CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (for example, several kilometers in radius) and may allow unrestricted access by UEs with service subscriptions with the network provider. A small cell may be associated with a lower-powered base station, as compared with a macro cell, and a small cell may operate in the same or different (for example, licensed, unlicensed, among other examples) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (for example, a home) and may provide restricted access by UEs having an association with the femto cell (for example, UEs in a closed subscriber group (CSG), UEs for users in the home, among other examples). An eNB for a macro cell may be referred to as a macro eNB. An eNB for a small cell may be referred to as a small cell eNB, a pico eNB, a femto eNB, or a home eNB. An eNB may support one or multiple (for example, two, three, four, among other examples) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at different locations, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (in other words, A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a first device, comprising:
   receiving an indication of a third set of transmit precoding matrix indicators based at least in part on one or more channel characteristics associated with a second device;
   determining a first set of transmit precoding matrix indicators associated with transmissions by the second device based at least in part on receiving the indication of the third set of transmit precoding matrix indicators;
   receiving a reference signal from the second device;
   determining an interference metric corresponding to full-duplex communications associated with the first device and the second device based at least in part on receiving the reference signal;
   determining a second set of transmit precoding matrix indicators based at least in part on the first set of transmit precoding matrix indicators and the determined interference metric; and
   transmitting, to a network equipment, an indication of the second set of transmit precoding matrix indicators.

2. The method of claim 1, wherein the third set of transmit precoding matrix indicators is received in medium access control signaling or in downlink control information that is specific to the first device.

3. The method of claim 1, wherein the third set of transmit precoding matrix indicators is received in downlink control information that is common to the first device and one or more additional devices.

4. The method of claim 1, further comprising receiving, from the network equipment, an association between the reference signal received from the second device and the third set of transmit precoding matrix indicators.

5. The method of claim 4, wherein the association comprises an indication of physical resources associated with transmission of the reference signal.

6. The method of claim 4, wherein the association between the reference signal received from the second device and the third set of transmit precoding matrix indicators comprises an explicit mapping or an implicit mapping, the implicit mapping based at least in part on an ordering of the third set of transmit precoding matrix indicators in a list of a plurality of subsets of transmit precoding matrix indicators.

7. The method of claim 1, further comprising:
   determining a fourth set of transmit precoding matrix indicators associated with transmissions of a third device;
   receiving a second reference signal from the third device;
   determining a second interference metric corresponding to full-duplex communications associated with the first device and the third device based at least in part on receiving the second reference signal;
   determining a fifth set of transmit precoding matrix indicators based at least in part on the fourth set of transmit precoding matrix indicators and the second interference metric; and
   transmitting, to the network equipment, an indication of the fifth set of transmit precoding matrix indicators.

8. The method of claim 7, wherein the second device and the third device are grouped for uplink multiple-user multiple-input multiple-output transmission.

9. The method of claim 1, wherein the indication of the second set of transmit precoding matrix indicators comprises a codepoint or a bitmap.

10. The method of claim 9, wherein the codepoint indicates an index of a set of transmit precoding matrix indicators in a list of sets of transmit precoding matrix indicators.

11. The method of claim 10, wherein a size of the list of sets of transmit precoding matrix indicators is equal to a combinatorial number based at least in part on selecting the second set of transmit precoding matrix indicators from the first set of transmit precoding matrix indicators.

12. The method of claim 9, wherein a bin of the bitmap indicates whether a transmit precoding matrix indicator of the first set of transmit precoding matrix indicators is included in the second set of transmit precoding matrix indicators, and wherein a mapping between the bin and the transmit precoding matrix indicator of the first set of transmit precoding matrix indicators is based at least in part on a position of the bin.

13. The method of claim 1, further comprising receiving a data transmission from the network equipment, wherein the data transmission is a full-duplex communication with a transmission from the second device.

14. The method of claim 1, wherein the reference signal is a sounding reference signal.

15. A first device for wireless communications, comprising:
   one or more processors;
   one or more memories coupled with the one or more processors; and instructions stored in the one or more memories and executable by the one or more processors to cause the first device to:
receive an indication of a third set of transmit precoding matrix indicators based at least in part on one or more channel characteristics associated with a second device;
determine a first set of transmit precoding matrix indicators associated with transmissions by the second device based at least in part on receiving the indication of the third set of transmit precoding matrix indicators;
receive a reference signal from the second device;
determine an interference metric corresponding to full-duplex communications associated with the first device and the second device based at least in part on receiving the reference signal;
determine a second set of transmit precoding matrix indicators based at least in part on the first set of transmit precoding matrix indicators, the determining based at least in part on the determined interference metric; and
transmit, to a network equipment, an indication of the second set of transmit precoding matrix indicators.

16. The first device of claim 15, wherein the indication of the second set of transmit precoding matrix indicators comprises a codepoint or a bitmap.

17. The first device of claim 16, wherein the codepoint indicates an index of a set of transmit precoding matrix indicators in a list of sets of transmit precoding matrix indicators.

18. The first device of claim 17, wherein a size of the list of sets of transmit precoding matrix indicators is equal to a combinatorial number based at least in part on selecting the second set of transmit precoding matrix indicators from the first set of transmit precoding matrix indicators.

19. The first device of claim 15, wherein the instructions are further executable by the one or more processors to cause the first device to receive a data transmission from the network equipment, wherein the data transmission is a full-duplex communication with a transmission from the second device.

20. The first device of claim 15, wherein the third set of transmit precoding matrix indicators is received in medium access control signaling or in downlink control information that is specific to the first device.

21. The first device of claim 15, wherein the third set of transmit precoding matrix indicators is received in downlink control information that is common to the first device and one or more additional devices.

22. The first device of claim 15, wherein the instructions are further executable by the one or more processors to cause the first device to receive, from the network equipment, an association between the reference signal received from the second device and the third set of transmit precoding matrix indicators.

23. The first device of claim 22, wherein the association comprises an indication of physical resources associated with transmission of the reference signal.

24. The first device of claim 22, wherein the association between the reference signal received from the second device and the third set of transmit precoding matrix indicators comprises an explicit mapping or an implicit mapping, the implicit mapping based at least in part on an ordering of the third set of transmit precoding matrix indicators in a list of a plurality of subsets of transmit precoding matrix indicators.

25. The first device of claim 15, wherein the instructions are further executable by the one or more processors to cause the first device to:
determine a fourth set of transmit precoding matrix indicators associated with transmissions of a third device;
receive a second reference signal from the third device;
determine a second interference metric corresponding to full-duplex communications associated with the first device and the third device based at least in part on receiving the second reference signal;
determine a fifth set of transmit precoding matrix indicators based at least in part on the fourth set of transmit precoding matrix indicators and the second interference metric; and
transmit, to the network equipment, an indication of the fifth set of transmit precoding matrix indicators.

26. The first device of claim 25, wherein the second device and the third device are grouped for uplink multiple-user multiple-input multiple-output transmission.

27. A non-transitory computer-readable medium storing code for wireless communications at a first device, the code comprising instructions executable by one or more processors to:
receive an indication of a third set of transmit precoding matrix indicators based at least in part on one or more channel characteristics associated with a second device;
determine a first set of transmit precoding matrix indicators associated with transmissions by the second device based at least in part on receiving the indication of the third set of transmit precoding matrix indicators;
receive a reference signal from the second device;
determine an interference metric corresponding to full-duplex communications associated with the first device and the second device based at least in part on receiving the reference signal;
determine a second set of transmit precoding matrix indicators based at least in part on the first set of transmit precoding matrix indicators, the determining based at least in part on the determined interference metric; and
transmit, to a network equipment, an indication of the second set of transmit precoding matrix indicators.

28. A first device for wireless communications, comprising:
means for receiving an indication of a third set of transmit precoding matrix indicators based at least in part on one or more channel characteristics associated with a second device;
means for determining a first set of transmit precoding matrix indicators associated with transmissions by the second device based at least in part on receiving the indication of the third set of transmit precoding matrix indicators;
means for receiving a reference signal from the second device;
means for determining an interference metric corresponding to full-duplex communications associated with the first device and the second device based at least in part on receiving the reference signal;

means for determining a second set of transmit precoding matrix indicators based at least in part on the first set of transmit precoding matrix indicators, the determining based at least in part on the determined interference metric; and
means for transmitting, to a network equipment, an indication of the second set of transmit precoding matrix indicators.

\* \* \* \* \*